(12) United States Patent
Hastings

(10) Patent No.: US 11,173,824 B1
(45) Date of Patent: Nov. 16, 2021

(54) TOP-LOADING REAR-DUMPING SLIDE TRAILER

(71) Applicant: Thomas M. Hastings, Omaha, NE (US)

(72) Inventor: Thomas M. Hastings, Omaha, NE (US)

( * ) Notice: Subject to any disclaimer, the term of this patent is extended or adjusted under 35 U.S.C. 154(b) by 153 days.

(21) Appl. No.: 16/510,505

(22) Filed: Jul. 12, 2019

Related U.S. Application Data

(60) Provisional application No. 62/697,241, filed on Jul. 12, 2018, provisional application No. 62/770,059, filed on Nov. 20, 2018.

(51) Int. Cl.
| | |
|---|---|
| *B60P 1/30* | (2006.01) |
| *B60P 1/16* | (2006.01) |
| *B60P 1/28* | (2006.01) |
| *B62D 63/06* | (2006.01) |

(52) U.S. Cl.
CPC ............. *B60P 1/30* (2013.01); *B60P 1/162* (2013.01); *B60P 1/28* (2013.01); *B62D 63/06* (2013.01)

(58) Field of Classification Search
CPC ........... B60P 1/16; B60P 1/283; B60P 1/6481; B60P 7/13
USPC ........ 298/22 C, 22 R, 22 P, 11, 14, 18, 17 S, 298/20 R, 22 F, 1 C; 414/408, 477, 501, 414/55, 21, 469, 487, 491, 11, 24.5, 332
See application file for complete search history.

(56) References Cited

U.S. PATENT DOCUMENTS

| | | | | |
|---|---|---|---|---|
| 2,231,058 | A * | 2/1941 | Doran ...................... | B65F 3/26 414/487 |
| 2,605,998 | A * | 8/1952 | Beck ........................ | B66F 3/24 254/1 |
| 3,892,323 | A * | 7/1975 | Corompt ............... | B60P 1/6463 414/491 |
| 3,966,254 | A * | 6/1976 | Guhl ..................... | B60K 28/00 298/22 C |
| 4,389,862 | A | 6/1983 | Hastings | |
| 5,193,836 | A | 3/1993 | Hastings | |
| 5,257,896 | A | 11/1993 | Hastings | |
| 5,924,829 | A | 7/1999 | Hastings | |
| 6,802,686 | B1 | 10/2004 | Hastings | |
| 8,152,432 | B2 * | 4/2012 | Cooper .................... | B60P 1/28 414/425 |

* cited by examiner

*Primary Examiner* — D Glenn Dayoan
*Assistant Examiner* — Sunsurraye Westbrook
(74) *Attorney, Agent, or Firm* — Suiter Swantz pc llo

(57) ABSTRACT

A transportable, top-loadable, and rear-unloadable slide trailer includes a frame, a secondary wheeled frame configured to translate relative to the frame between a forward position and a rearward position via a slideable assembly between the frame and the secondary wheeled frame, a bulk material carrier positionable in a load position and an unload position, and an unloader assembly coupled to the bulk material carrier and the frame. The trailer is loadable with the bulk material carrier in the load position. The trailer is transportable with the secondary wheeled frame in the rearward position and the bulk material carrier in the load position. The trailer is unloadable with the bulk material carrier in the unload position and the secondary wheeled frame in the forward position.

6 Claims, 27 Drawing Sheets

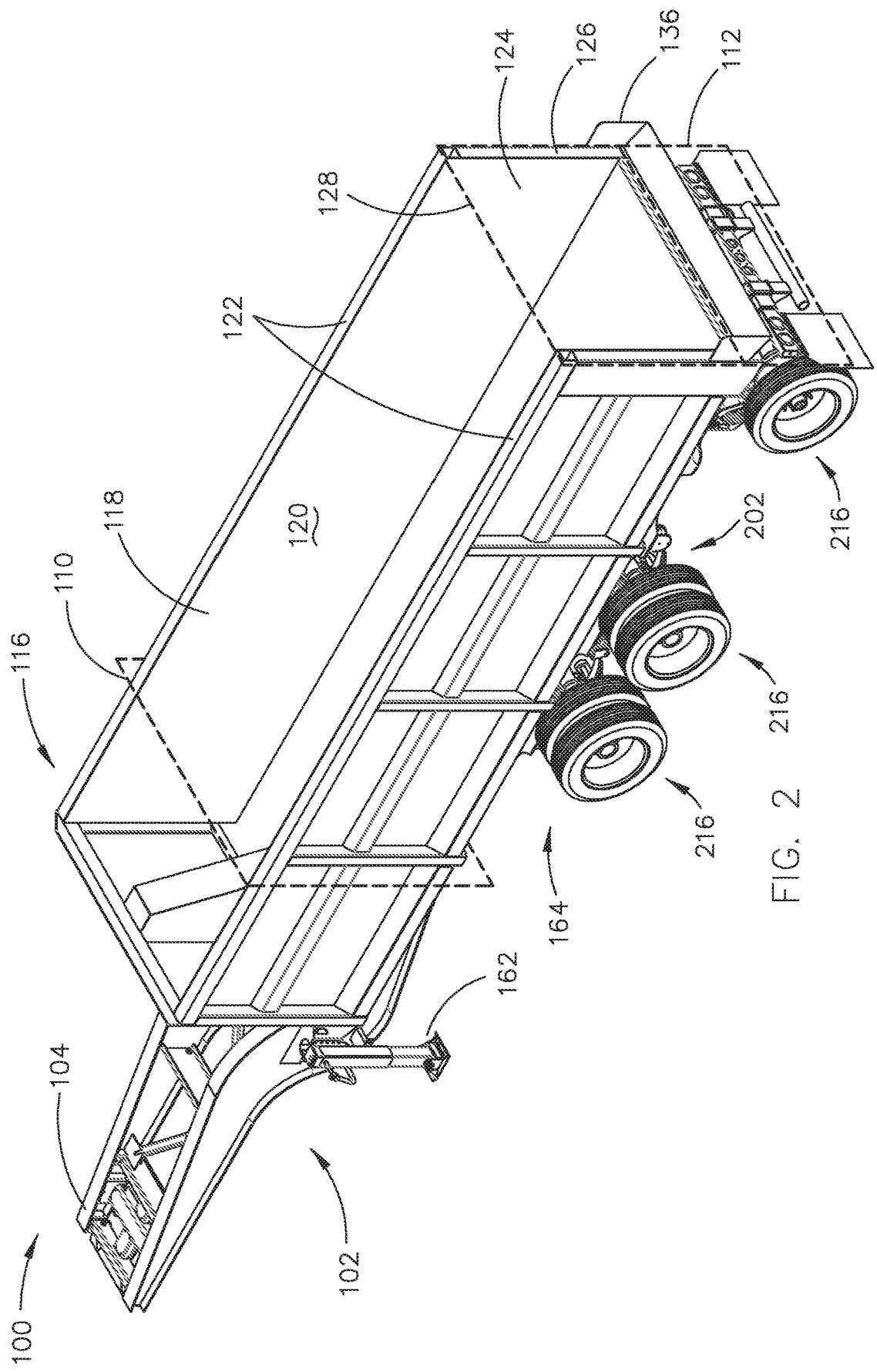

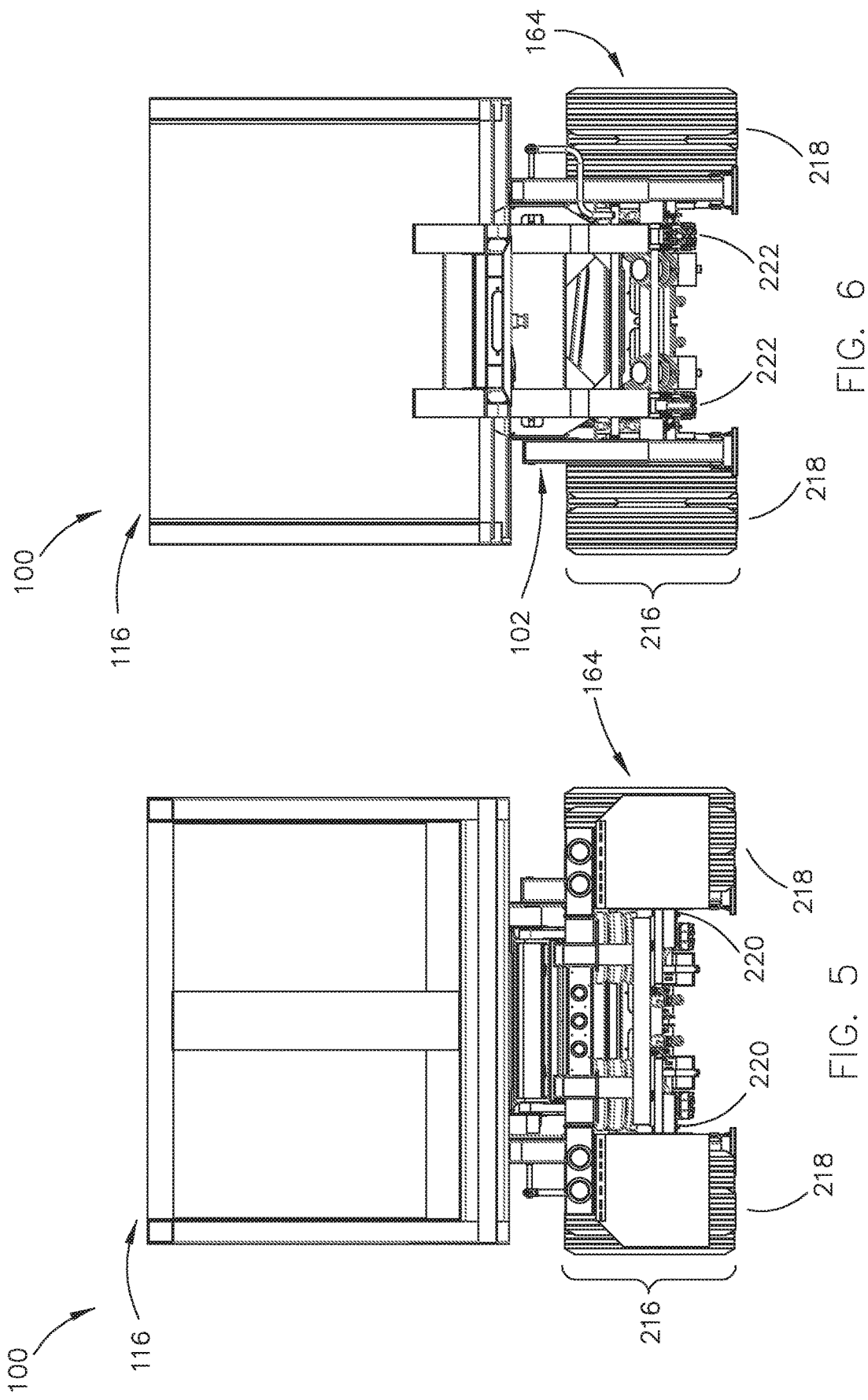

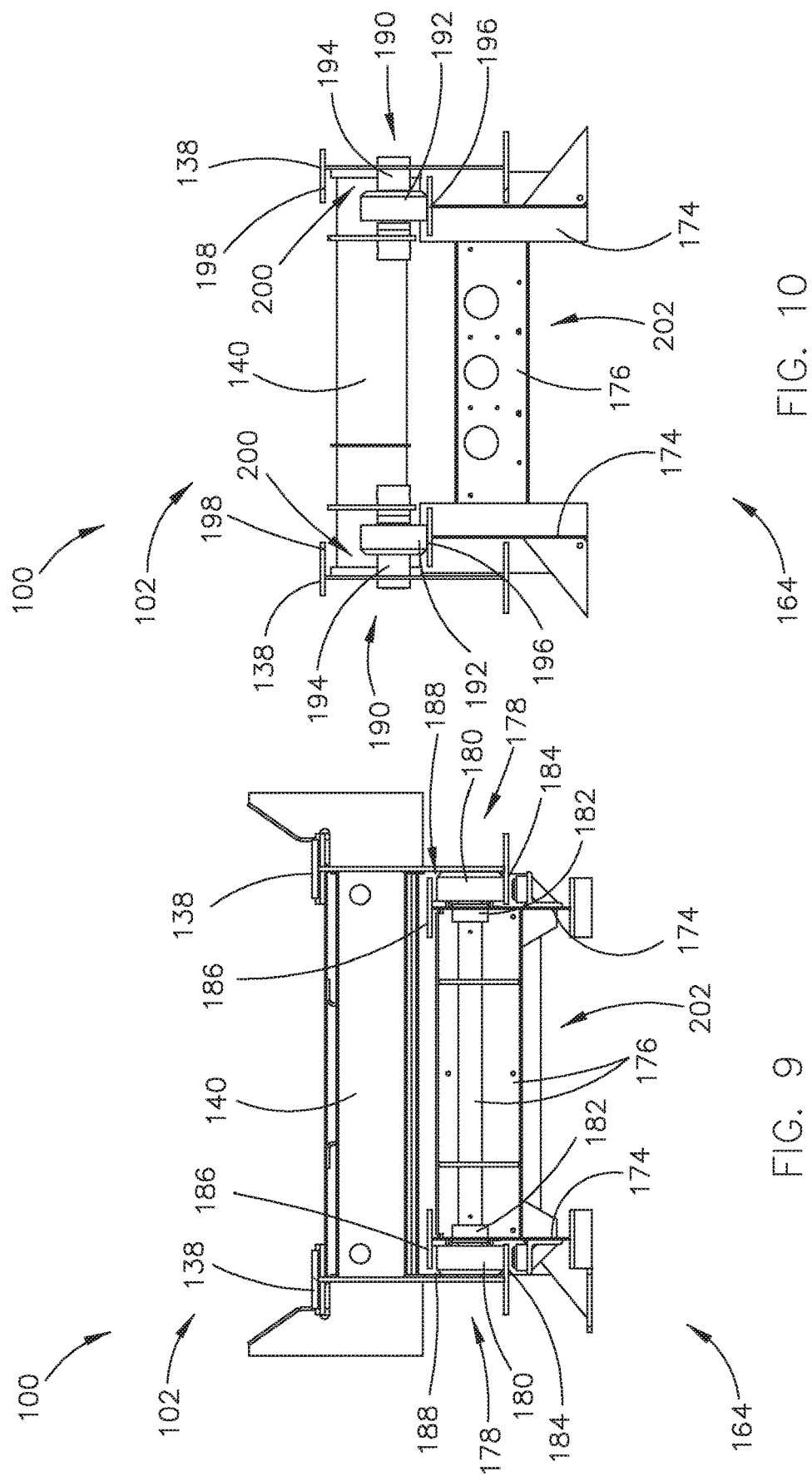

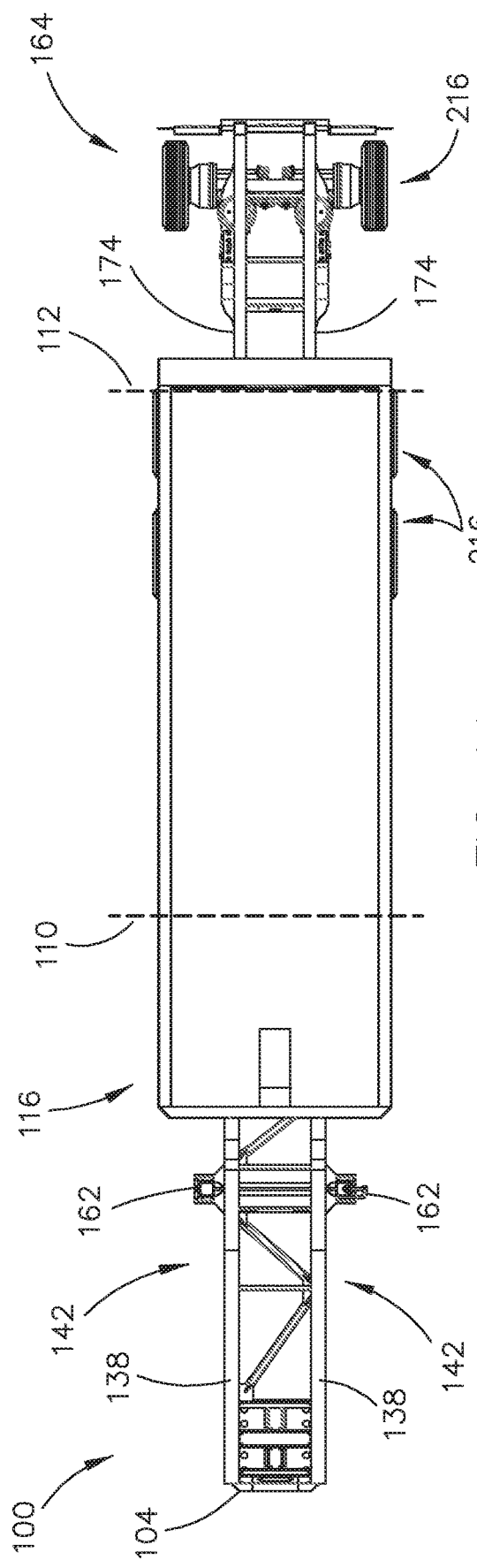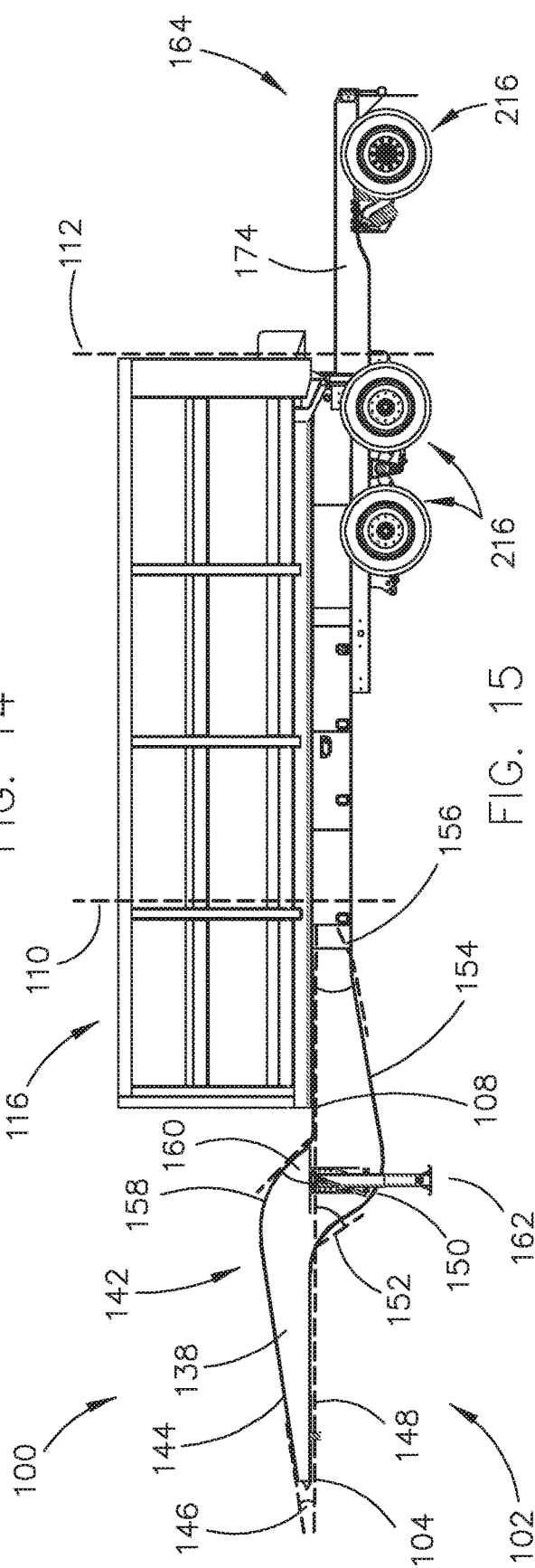

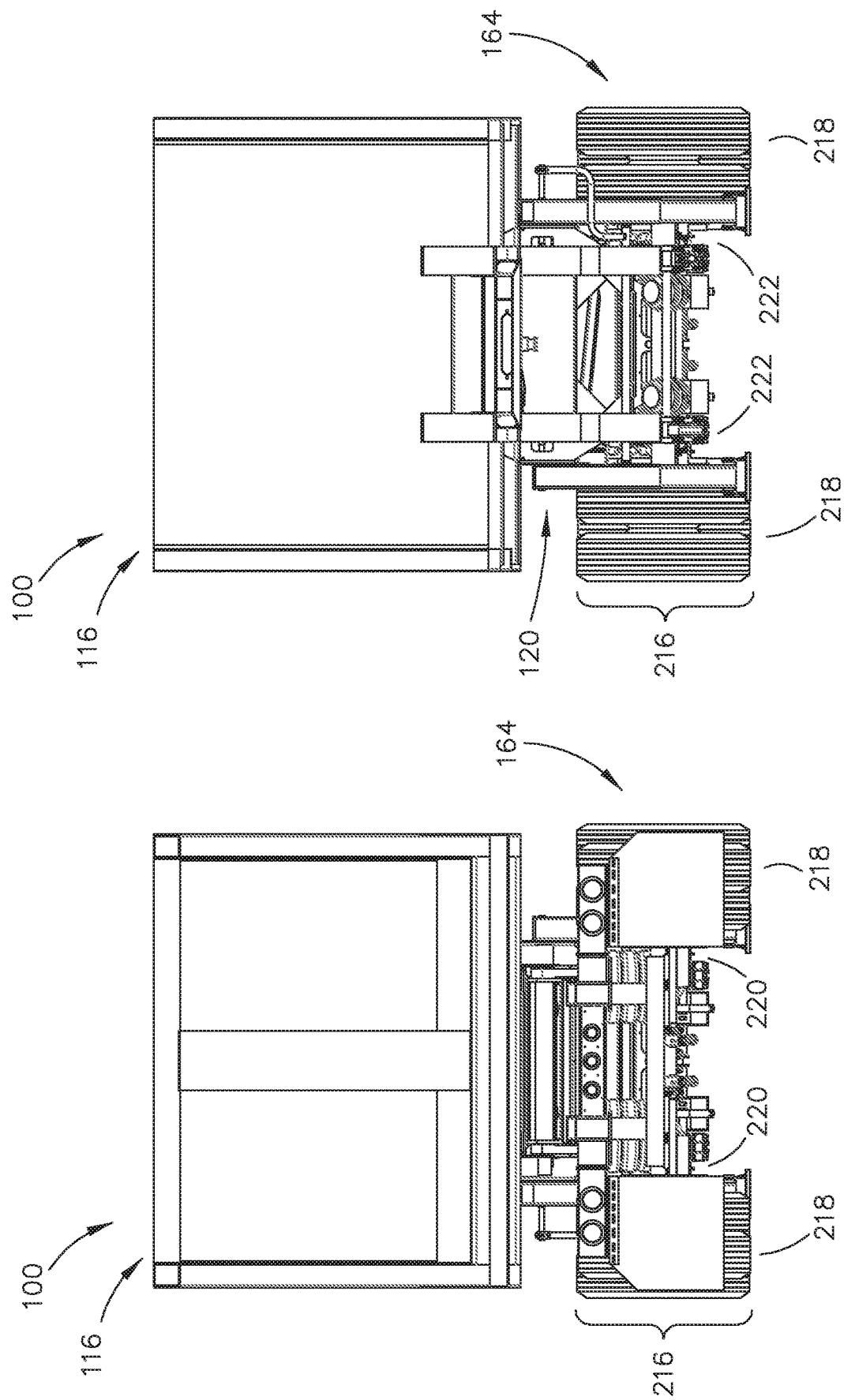

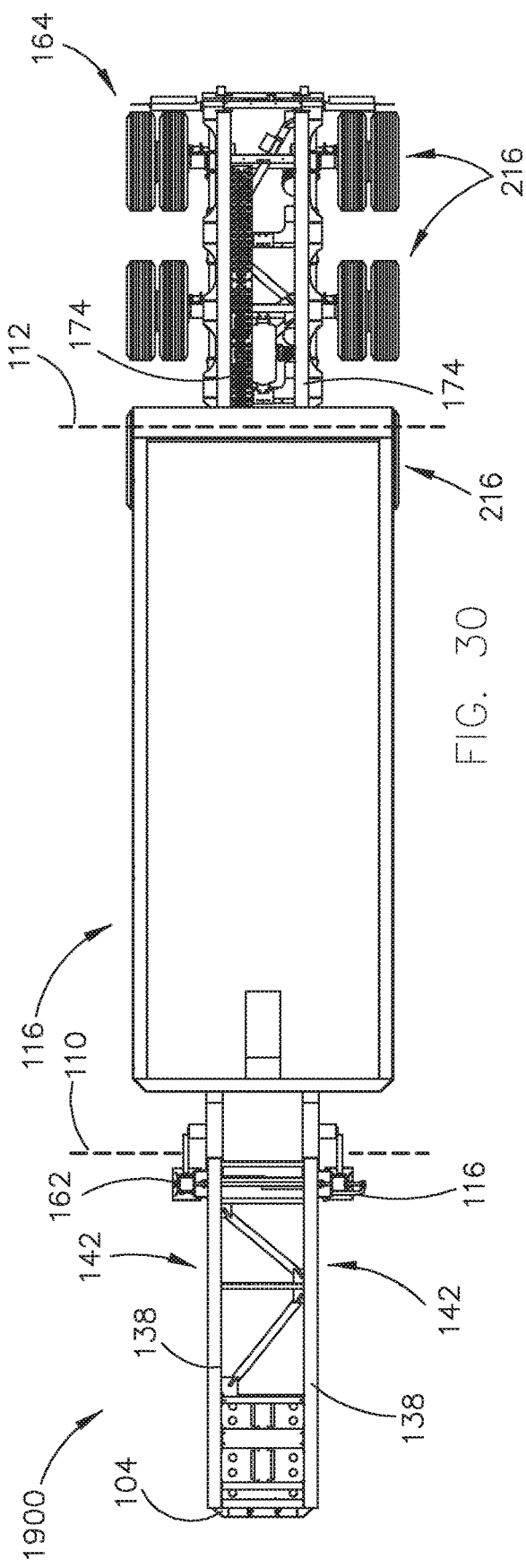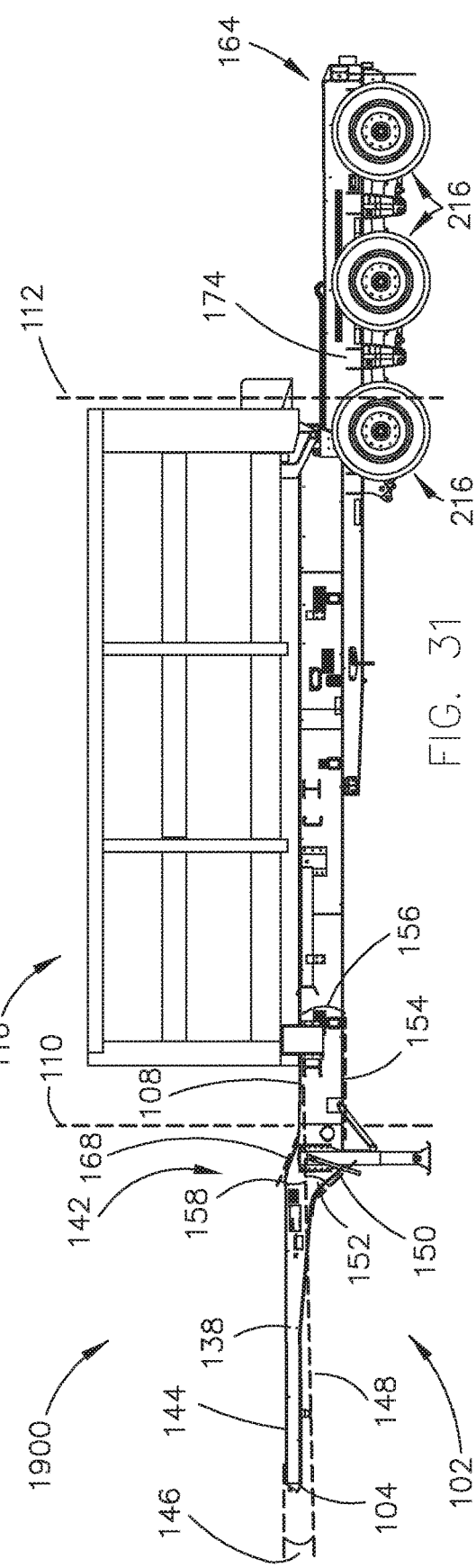

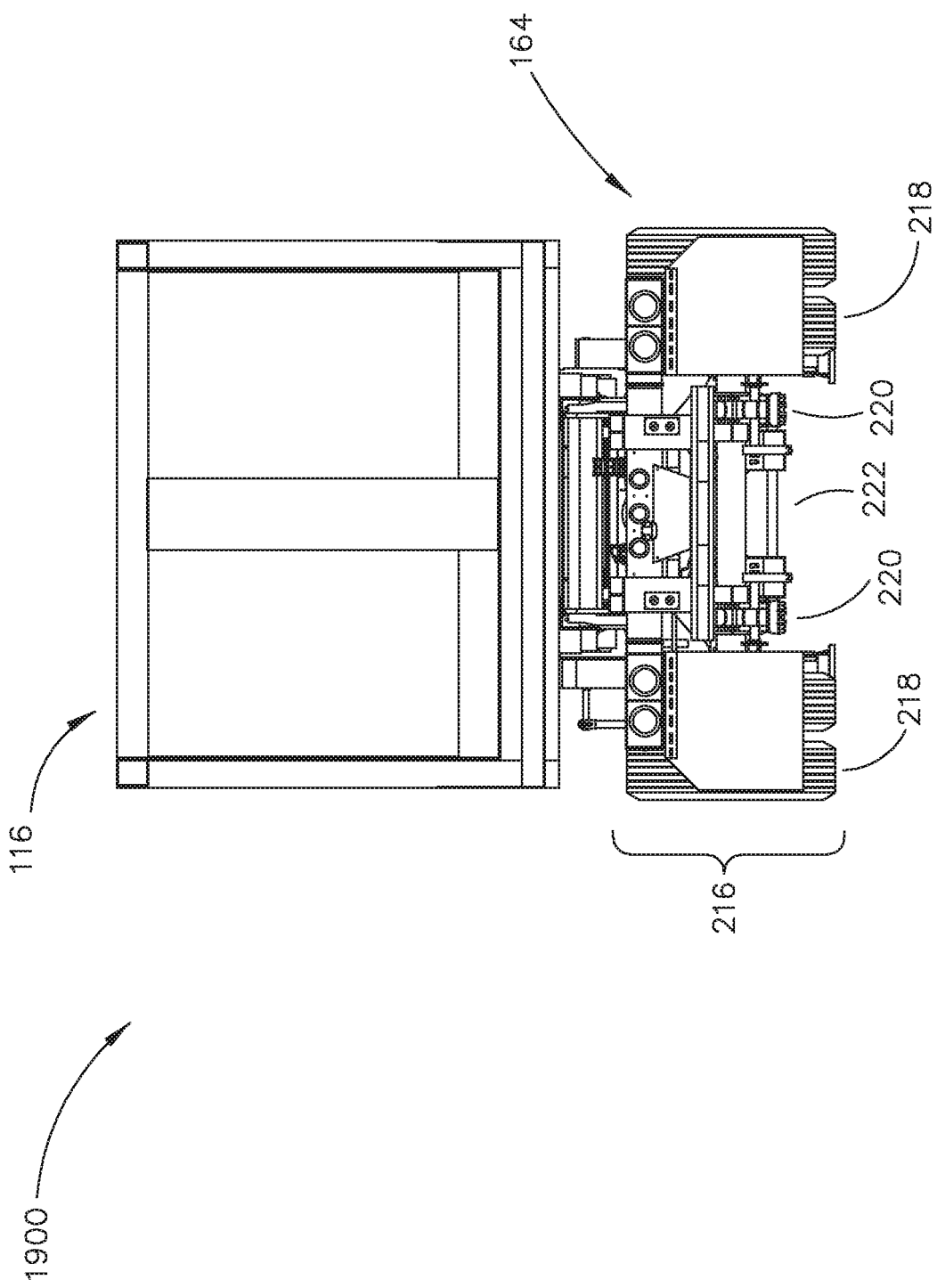

TOP-LOADING REAR-DUMPING SLIDE TRAILER

CROSS-REFERENCE TO RELATED APPLICATIONS

The present application claims the benefit under 35 U.S.C. § 119(e) of U.S. Provisional Patent Application Ser. No. 62/697,241, filed Jul. 12, 2018, titled SLIDE-DUMP TRAILER, naming Thomas Hastings as inventor, which is incorporated herein by reference in the entirety.

The present application claims the benefit under 35 U.S.C. § 119(e) of U.S. Provisional Patent Application Ser. No. 62/770,059, filed Nov. 20, 2018, titled SLIDE-DUMP TRAILER, naming Thomas Hastings as inventor, which is incorporated herein by reference in the entirety.

TECHNICAL FIELD

The present disclosure relates generally to weight accommodation on freight carriers, and more particularly to a top-loading rear-dumping slide trailer.

BACKGROUND

Loads for transportation across bridges and the like are restricted to gross weights determined to be safely within structural and maintenance limits. Bridges on the Interstate System highways are designed to support a wide variety of vehicles and their expected loads. These restrictions are based on select dimensions of the vehicle, and are determinable in part with the Bridge Formula enacted into law by Congress under 23 U.S.C. § 127 and 23 C.F.R. § 658.

One approach to increasing an amount of weight that may be legally transported in a load is to increase one or more dimensions of a hauling apparatus, the dimensions of the hauling apparatus including, but not limited to, hauling apparatus length, hauling apparatus width, hauling apparatus sidewall height, or the like. Another approach to increasing the amount of weight that may be legally transported in a load is to increase one or more dimensions of the trailer coupled to the hauling apparatus, the trailer dimensions including, but not limited to, axle number, axle spacing, or the like. Increases in these dimensions, however, may result in decreased mobility and/or safety.

SUMMARY

A transportable, top-loadable, and rear-unloadable bulk material carrier system is disclosed, in accordance with one or more embodiments of the disclosure. The bulk material carrier system may include a bulk material carrier. The bulk material carrier is top-loadable with bulk material via a top opening of the bulk material carrier when the bulk material carrier is in a load configuration. The bulk material carrier is rear-unloadable of bulk material via a rear opening of the bulk material carrier when the bulk material carrier is in an unload configuration. The bulk material carrier system includes an unloader assembly configured to assist in unloading bulk material through the rear opening of the bulk material carrier when the bulk material carrier is in the unload configuration. The bulk material carrier system includes a frame with a first end and a second end, the frame being fixedly coupled to the bulk material carrier proximate to the second end of the frame via the unloader assembly. The frame is slideably couplable to a secondary wheeled frame including at least two load-supporting axles. The bulk material carrier system is transportable by a vehicle couplable to the first end of the frame.

In some embodiments of the bulk material carrier system, the frame is slideably couplable to the secondary wheeled frame via a slideable assembly. The secondary wheeled frame is configured to translate relative to the frame between a forward position and a rearward position via the slideable assembly.

In some embodiments of the bulk material carrier system, the slideable assembly includes a portion of a surface of the frame, a portion of a surface of the secondary wheeled frame, and a roller configured to pass through a channel formed by the portion of the surface of the frame and the portion of the surface of the secondary wheeled frame.

In some embodiments of the bulk material carrier system, the secondary wheeled frame including the at least two load-supporting axles is positioned within a region defined by the first end and the second end of the frame when the secondary wheeled frame is in the forward position.

In some embodiments of the bulk material carrier system, one or more load-supporting axle of the at least two load-supporting axles are positioned outside of a region defined by the first end and the second end of the frame when the secondary wheeled frame is in the rearward position.

In some embodiments of the bulk material carrier system, the at least two load-supporting axles are configured to support at least a portion of the weight of the frame and the bulk material carrier. Translating the secondary wheeled frame from the forward position to the rearward position reduces the portion of the weight of the frame and the bulk material carrier supported by the at least two load supporting axles.

In some embodiments of the bulk material carrier system, the secondary wheeled frame may translate between the forward position and the rearward position by engaging a brake on one or more of the at least two load-supporting axles of the secondary wheel frame and sliding the frame relative to the secondary wheeled frame. The frame is slideable relative to the secondary wheeled frame following a force applied by a vehicle coupled to the first end of the frame.

In some embodiments of the bulk material carrier system, the secondary wheeled frame may be securable in either the forward position or the rearward position via a lock assembly. The lock assembly includes an actuator configured to cause one or more lock pins to at least one of engage or disengage from one or more lock holes. Engaging the one or more lock holes with the one or more lock pins secures the secondary wheeled frame in either the forward position or the rearward position. Disengaging the one or more lock holes from the one or more lock pins allows the secondary wheeled frame to translate between the forward position and the rearward position.

In some embodiments of the bulk material carrier system, the secondary wheeled frame may translate between the forward position and the rearward position by engaging the brake on one or more of the at least two load-supporting axles of the secondary wheel frame, disengaging the one or more lock holes from the one or more lock pins of the lock assembly, and sliding the frame relative to the secondary wheeled frame. The frame is slideable relative to the secondary wheeled frame following the force applied by the vehicle coupled to the first end of the frame.

In some embodiments of the bulk material carrier system, the at least two load-supporting axles are configured to come into contact with a transport surface.

In some embodiments of the bulk material carrier system, the frame further includes a frame connector proximate to the first end of the frame. The frame connector is couplable to a vehicle connector of a vehicle. The frame connector is rotatable relative to a position of the vehicle connector about a central axis shared with the vehicle connector. The frame connector and the vehicle connector comprise a hitch assembly.

In some embodiments of the bulk material carrier system, the frame further includes a gooseneck between the first end of the frame and the second end of the frame. The gooseneck includes one or more contoured profiles configured to reduce an amount of loaded deflection within the frame.

In some embodiments of the bulk material carrier system, the unloader assembly includes a pivot assembly. The pivot assembly includes a first component coupled to the bulk material carrier. The pivot assembly includes a second component coupled to the frame. The bulk material carrier is pivotable about a central axis shared by the first component and the second component when transitioning from the load configuration to the unload configuration.

In some embodiments of the bulk material carrier system, further including one or more hydraulic cylinders connected between the frame and the bulk material carrier. The bulk material carrier is positionable in at least one of the load configuration or the unload configuration by the pivot assembly and the one or more hydraulic cylinders connected between the frame and the bulk material carrier.

A top-loading rear-dumping slide trailer is disclosed, in accordance with one or more embodiments of the disclosure. In some embodiments, the trailer includes a bulk material carrier. The bulk material carrier is top-loadable with bulk material via a top opening of the bulk material carrier when the bulk material carrier is in a load configuration. The bulk material carrier is rear-unloadable of bulk material via a rear opening of the bulk material carrier when the bulk material carrier is in an unload configuration. The trailer includes an unloader assembly configured to assist in unloading bulk material through the rear opening of the bulk material carrier when the bulk material carrier is in the unload configuration. The trailer includes frame including a first end and a second end. The frame is fixedly coupled to the bulk material carrier proximate to the second end of the frame via the unloader assembly. The trailer includes a secondary wheeled frame including at least two load-supporting axles. The frame is slideably couplable to the secondary wheeled frame via a slideable assembly. The top-loading rear-dumping slide trailer is transportable by a vehicle couplable to the first end of the frame.

In some embodiments of the bulk material carrier system, the slideable assembly includes a portion of a surface of the frame, a portion of a surface of the secondary wheeled frame, and a roller configured to pass through a channel formed by the portion of the surface of the frame and the portion of the surface of the secondary wheeled frame.

In some embodiments of the bulk material carrier system, the unloader assembly includes a pivot assembly. The pivot assembly includes a first component coupled to the bulk material carrier, and a second component coupled to the frame. The bulk material carrier is pivotable about a central axis shared by the first component and the second component when transitioning from the load configuration to the unload configuration. The bulk material carrier is positionable in at least one of the load configuration or the unload configuration by the pivot assembly and one or more hydraulic cylinders connected between the frame and the bulk material carrier.

A method for loading, transporting, and unloading a top-loading rear-dumping slide trailer is disclosed, in accordance with one or more embodiments of the disclosure. The method may include, but is not limited to, loading bulk material in a bulk material carrier coupled to a frame including a first end and a second end. The bulk material carrier is top-loadable with bulk material via a top opening of the bulk material carrier when the bulk material carrier is in a load configuration. A vehicle is couplable to the first end of the frame. The method may include, but is not limited to, transporting the bulk material with a secondary wheeled frame being in a rearward position. The secondary wheeled frame includes at least two load-supporting axles. The frame is slideably couplable to the secondary wheeled frame via a slideable assembly. One or more load-supporting axle of the at least two load-supporting axles are disposed outside of a region defined by the first end and the second end of the frame when the secondary wheeled frame is in the rearward position. The method may include, but is not limited to, translating the secondary wheeled frame from the rearward position to a forward position by engaging a brake on one or more load-supporting axle of the at least two load-supporting axles of the secondary wheel frame and sliding the frame relative to the secondary wheeled frame via a slideable assembly. The at least two load-supporting axles are disposed within the region defined between the first end and the second end of the frame when the secondary wheeled frame is in the forward position. The method may include, but is not limited to, unloading the bulk material carrier. The bulk material carrier is rear-unloadable of bulk material via a rear opening of the bulk material carrier with assistance of an unloader assembly when the bulk material carrier is in an unload configuration.

In some embodiments of the bulk material carrier system, the unloader assembly includes a pivot assembly. The pivot assembly includes a first component coupled to the bulk material carrier, and a second component coupled to the frame. The bulk material carrier is pivotable about a central axis shared by the first component and the second component when transitioning from the load configuration to the unload configuration. The bulk material carrier is positionable in at least one of the load configuration or the unload configuration by the pivot assembly and one or more hydraulic cylinders connected between the frame and the bulk material carrier.

In some embodiments of the bulk material carrier system, the method may include, but is not limited to, disengaging a lock assembly prior to translating the secondary wheeled frame from the rearward position to the forward position, and engaging the lock assembly prior to unloading the bulk material.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 is a perspective view of the top-loading rear-dumping slide trailer with a slideable secondary wheeled frame in a forward position and the bulk material carrier in the load position, in accordance with one or more embodiments of the disclosure;

FIG. 5 illustrates a rear elevation view of the top-loading rear-dumping slide trailer of FIG. 2 with the slideable secondary wheeled frame in the forward position and the bulk material carrier in the load position, in accordance with one or more embodiments of the disclosure;

FIG. 6 illustrates a front elevation view of the top-loading rear-dumping slide trailer of FIG. 2 with the slideable secondary wheeled frame in the forward position and the bulk material carrier in the load position, in accordance with one or more embodiments of the disclosure;

FIG. 9 illustrates a cross-section view of a frame and the slideable secondary wheeled frame of the top-loading rear-dumping slide trailer of FIG. 2, in accordance with one or more embodiments of the disclosure;

FIG. 10 illustrates a cross-section view of the frame and the slideable secondary wheeled frame of the top-loading rear-dumping slide trailer of FIG. 2, in accordance with one or more embodiments of the disclosure;

FIG. 14 illustrates a top plan view of the top-loading rear-dumping slide trailer of FIG. 2 with the slideable secondary wheeled frame in the rearward position and the bulk material carrier in the load position, in accordance with one or more embodiments of the disclosure;

FIG. 15 illustrates a side elevation view of the top-loading rear-dumping slide trailer of FIG. 2 with the slideable secondary wheeled frame in the rearward position and the bulk material carrier in the load position, in accordance with one or more embodiments of the disclosure;

FIG. 16 illustrates a rear elevation view of the top-loading rear-dumping slide trailer of FIG. 2 with the slideable secondary wheeled frame in the rearward position and the bulk material carrier in the load position, in accordance with one or more embodiments of the disclosure;

FIG. 17 illustrates a front elevation view of the top-loading rear-dumping slide trailer of FIG. 2 with the slideable secondary wheeled frame in the rearward position and the bulk material carrier in the load position, in accordance with one or more embodiments of the disclosure;

FIG. 30 illustrates a top elevation view of the top-loading rear-dumping slide trailer of FIG. 20 with the slideable secondary wheeled frame in the rearward position and the bulk material carrier in the load position, in accordance with one or more embodiments of the disclosure;

FIG. 31 illustrates a side elevation view of the top-loading rear-dumping slide trailer of FIG. 20 with the slideable secondary wheeled frame in the rearward position and the bulk material carrier in the load position, in accordance with one or more embodiments of the disclosure; and FIG. 32 illustrates a rear elevation view of the top-loading rear-dumping slide trailer of FIG. 20 with the slideable secondary wheeled frame in the rearward position and the bulk material carrier in the load position, in accordance with one or more embodiments of the disclosure.

DETAILED DESCRIPTION OF THE INVENTION

Figure 1A:
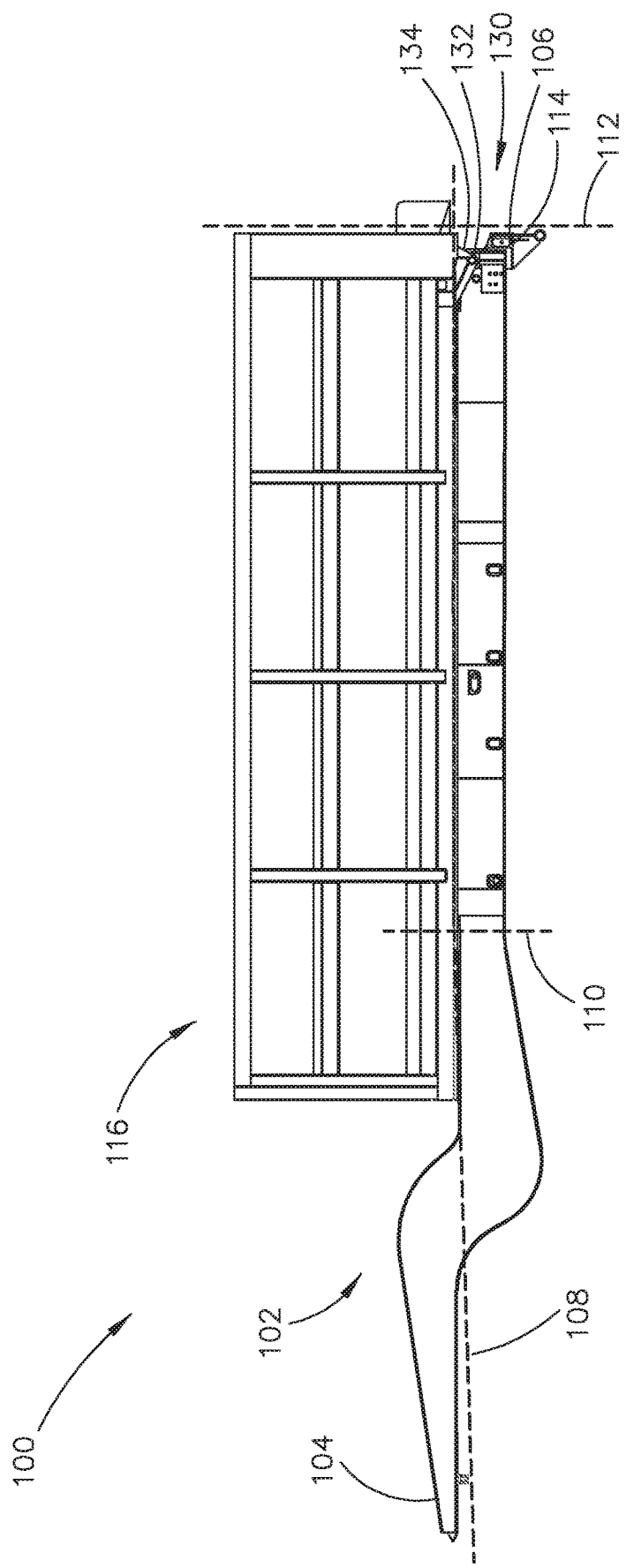
FIG. 1A is a side elevation view of a bulk material carrier system of a top-loading rear-dumping slide trailer in a load position, in accordance with one or more embodiments of the disclosure.
Figure 1B:
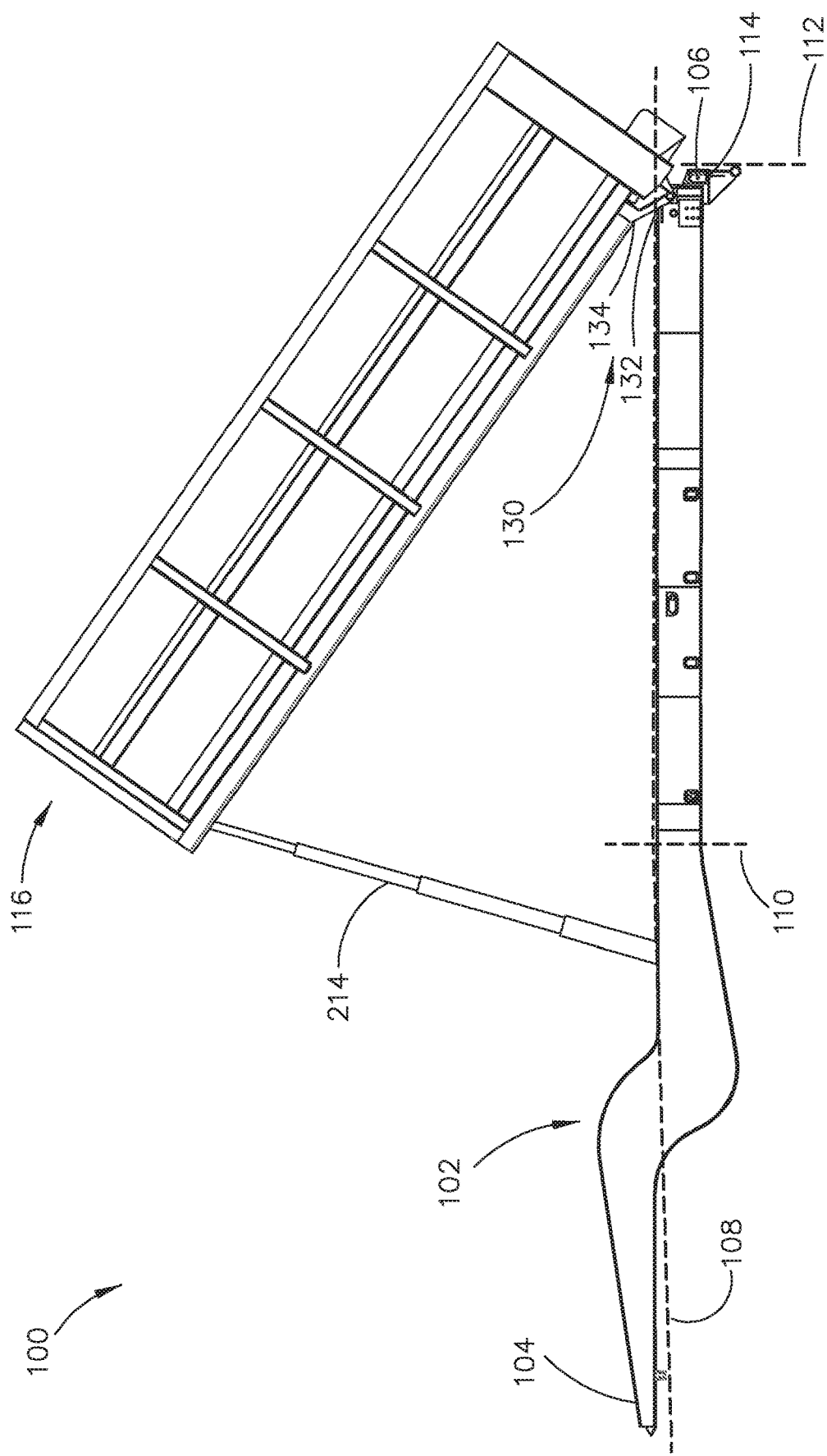
FIG. 1B is a side elevation view of the bulk material carrier system as illustrated in FIG. 1A of the top-loading rear-dumping slide trailer in an unload position, in accordance with one or more embodiments of the present disclosure.
Figure 3:
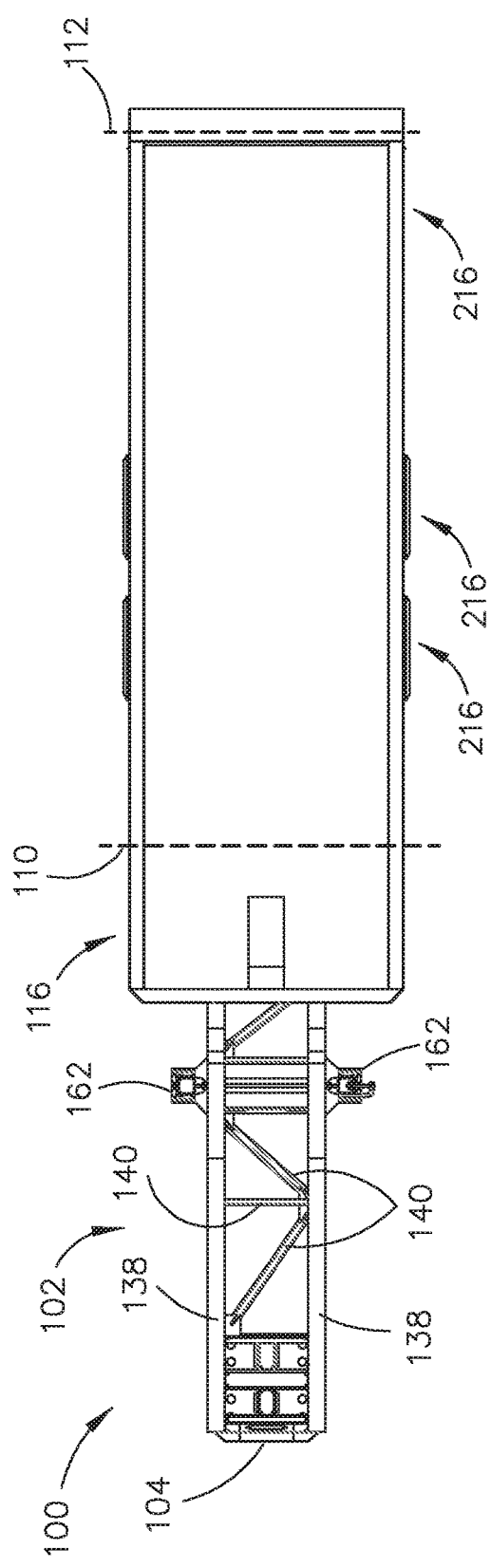
FIG. 3 illustrates a top plan view of the top-loading rear-dumping slide trailer of FIG. 2 with the slideable secondary wheeled frame in the forward position and the bulk material carrier in the load position, in accordance with one or more embodiments of the disclosure.
Figure 4:
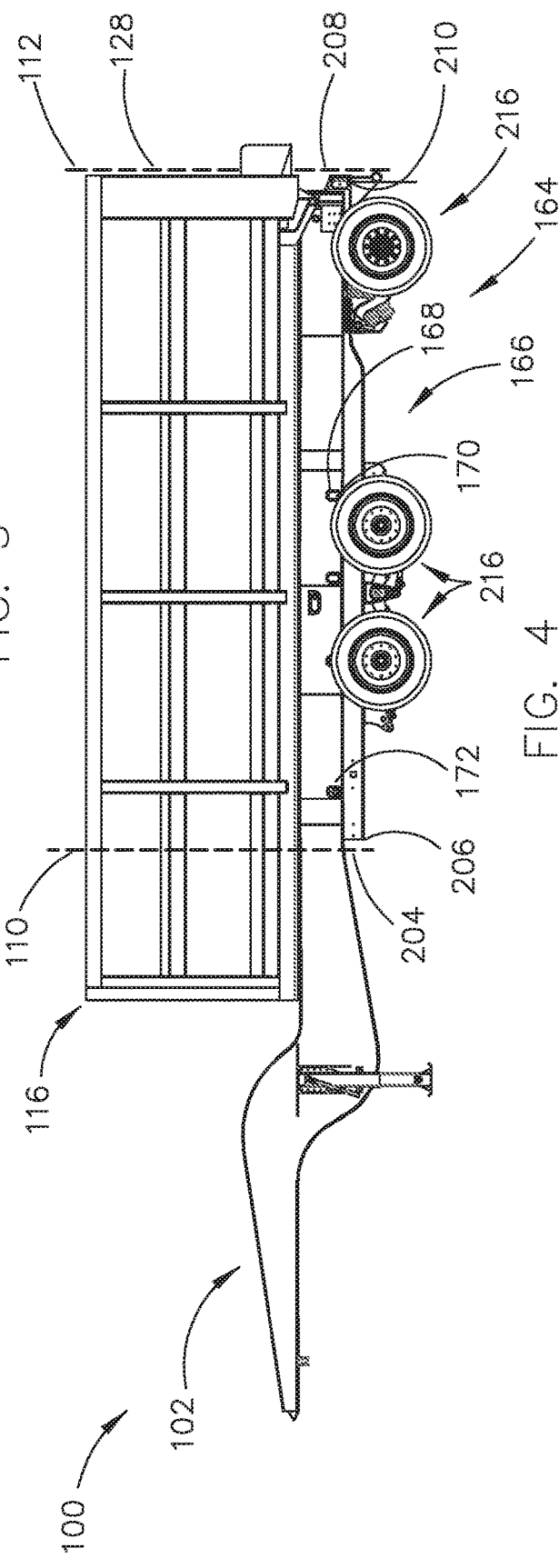
FIG. 4 illustrates a side elevation view of the top-loading rear-dumping slide trailer of FIG. 2 with the slideable secondary wheeled frame in the forward position and the bulk material carrier in the load position, in accordance with one or more embodiments of the disclosure.
Figure 7:
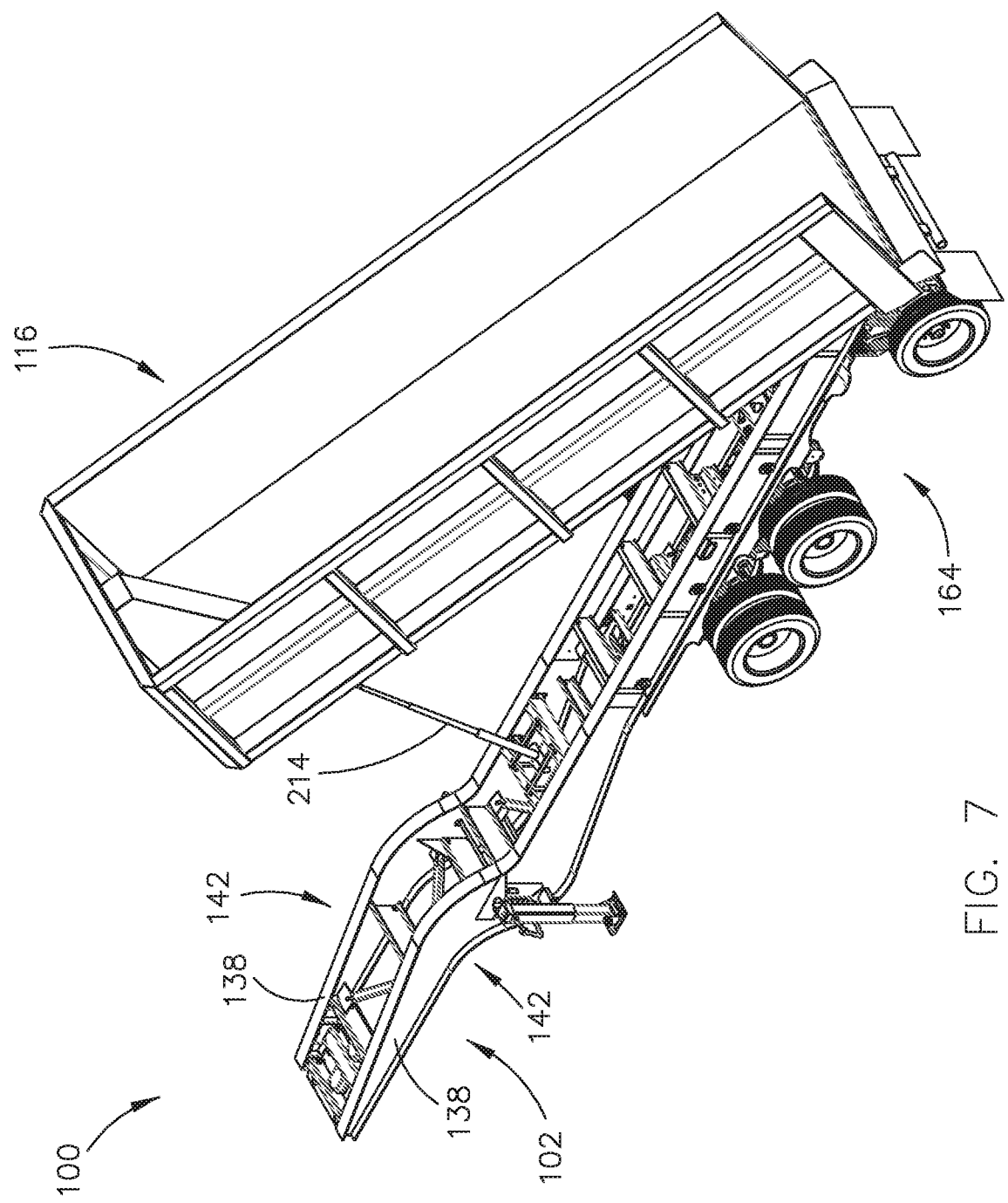
FIG. 7 illustrates a perspective view of the top-loading rear-dumping slide trailer of FIG. 2 with the slideable secondary wheeled frame in the forward position and the bulk material carrier in the unload position, in accordance with one or more embodiments of the disclosure.
Figure 8:
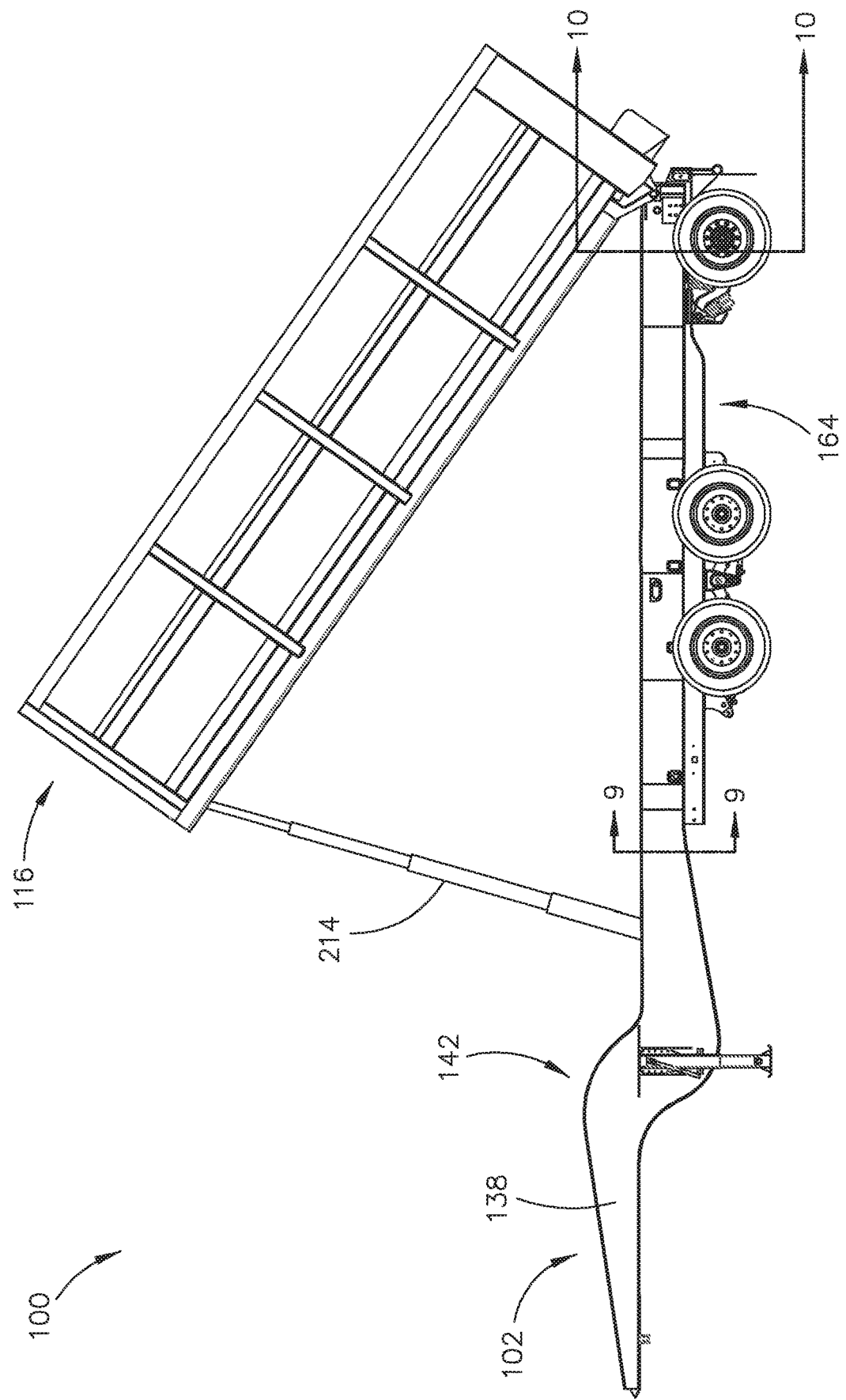
FIG. 8 illustrates a side elevation view of the top-loading rear-dumping slide trailer of FIG. 2 with the slideable secondary wheeled frame in the forward position and the bulk material carrier in the unload position, in accordance with one or more embodiments of the disclosure.
Figure 11:
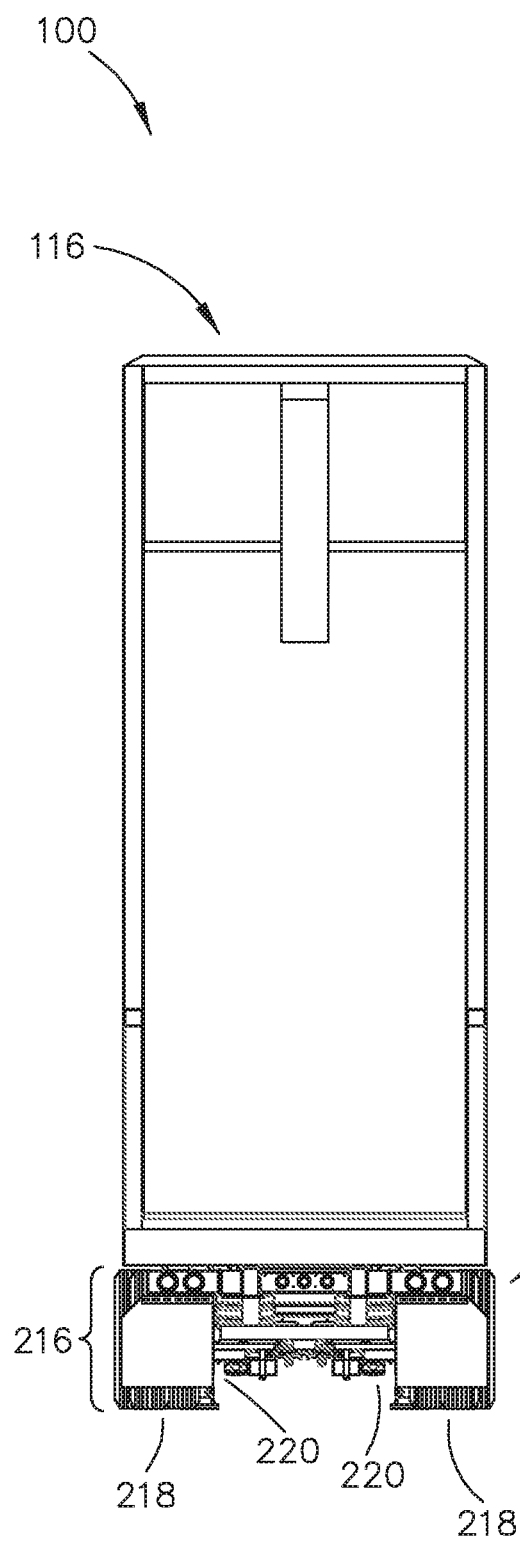
FIG. 11 illustrates a rear elevation view of the top-loading rear-dumping slide trailer of FIG. 2 with the slideable secondary wheeled frame in the forward position and the bulk material carrier in the unload position, in accordance with one or more embodiments of the disclosure.
Figure 12:
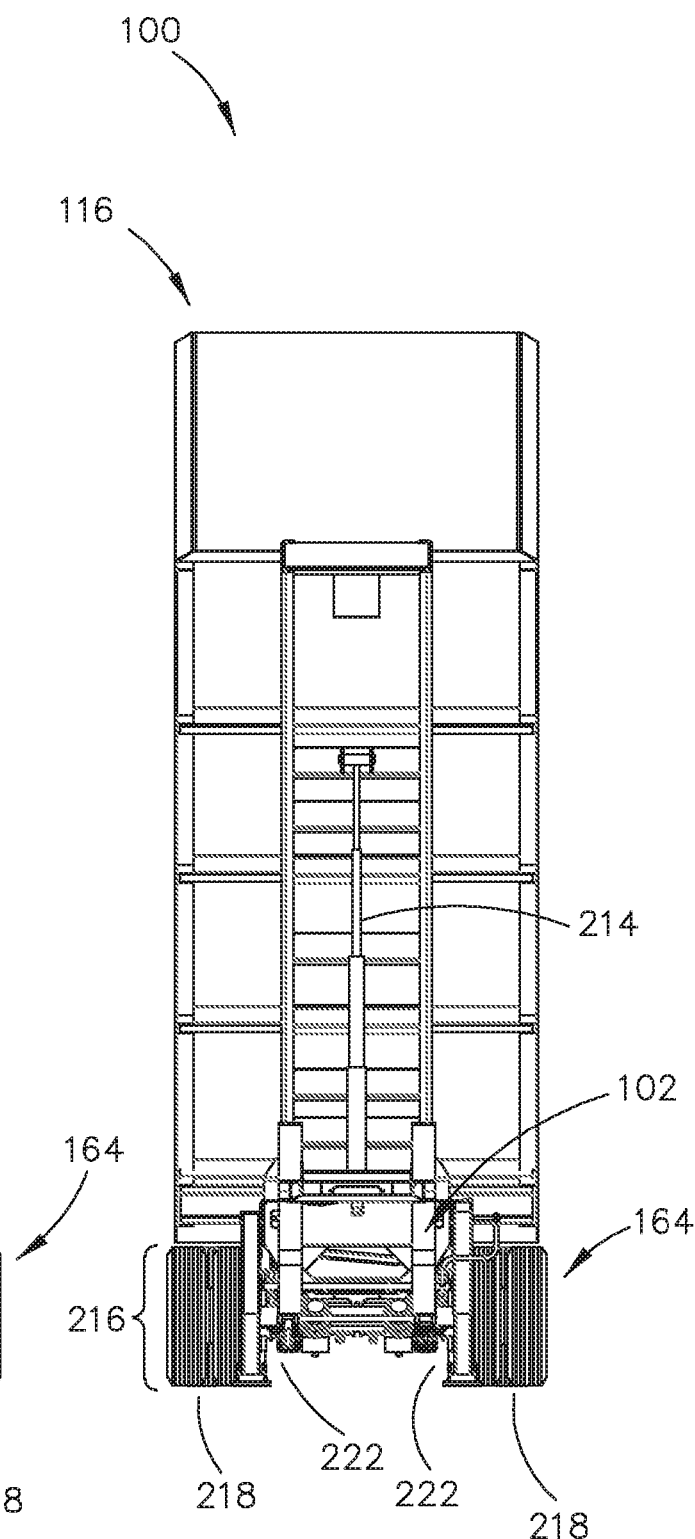
FIG. 12 illustrates a front elevation view of the top-loading rear-dumping slide trailer of FIG. 2 with the slideable secondary wheeled frame in the forward position and the bulk material carrier in the unload position, in accordance with one or more embodiments of the disclosure.
Figure 13:
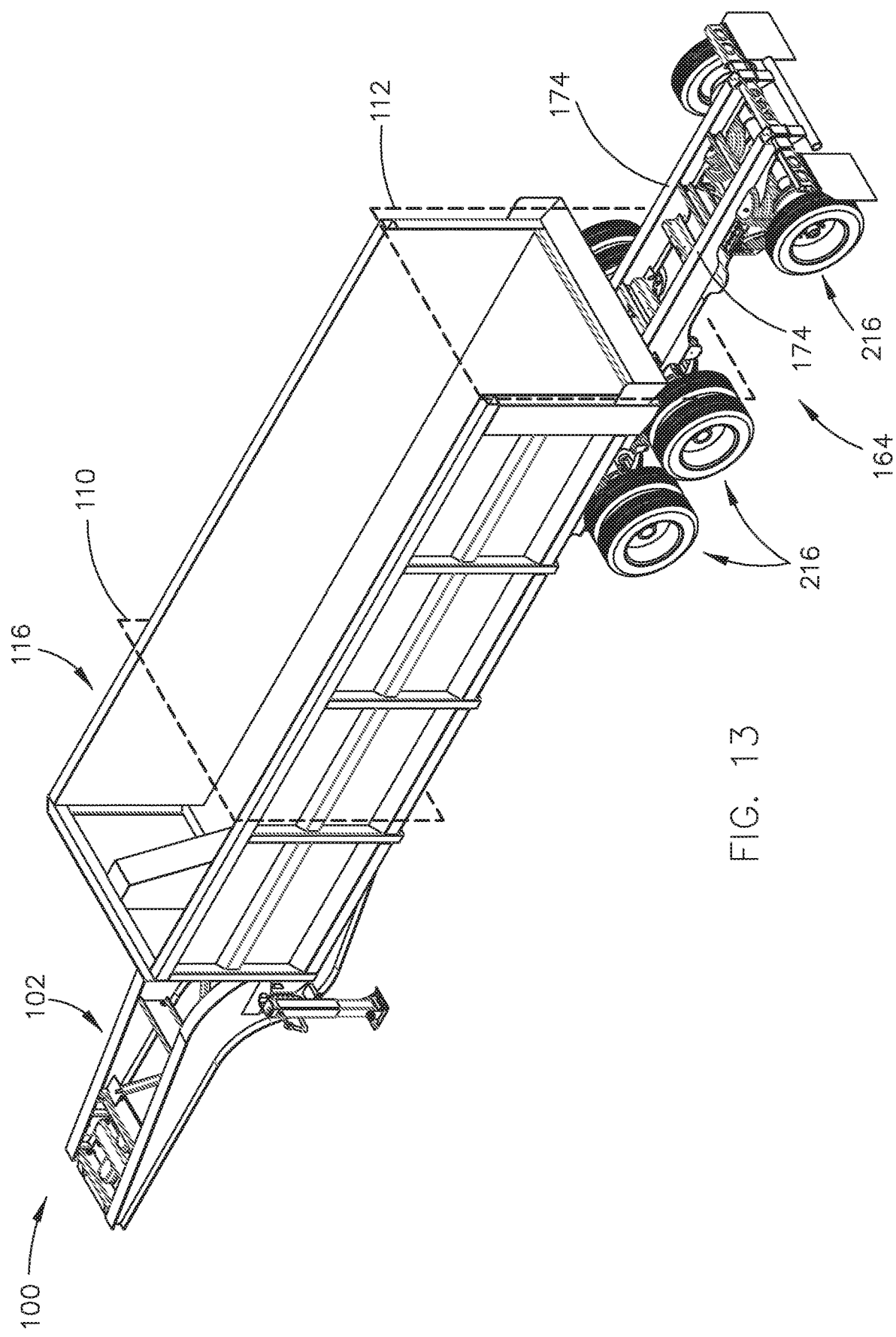
FIG. 13 illustrates a perspective view of the top-loading rear-dumping slide trailer of FIG. 2 with the slideable secondary wheeled frame in the rearward position and the bulk material carrier in the load position, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

In addition, as used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-32 generally illustrate examples of a top-loading rear-dumping slide trailer, in accordance with one or more embodiments of the disclosure.

Broadly, embodiments of the disclosure are directed to a top-loading rear-dumping slide trailer. More particularly, embodiments of the disclosure are directed to a trailer configured with a frame coupled to a loadable/unloadable bulk material carrier and a slideable secondary wheeled frame.

FIGS. 1A-18C generally illustrate an example of a top-loading side-dumping slide trailer 100, in accordance with one or more embodiments of the disclosure. It is noted herein that "top-loading rear-dumping slide trailer 100" and variants of the term "top-loading rear-dumping slide trailer 100" (e.g., "slide dump trailer 100", "trailer 100," or the like) may be considered equivalent, for purposes of the disclosure.

The top-loading rear-dumping trailer 100 may include a frame 102. The frame 102 may include a first end 104 and a second end 106.

The frame 102 may be defined by a substantially horizontal plane 108, where the plane 108 is disposed substantially parallel with a transport surface (e.g., road, ground, or the like). It is noted herein that the frame 102 and/or the plane 108 may include a slight amount of positive bend (e.g. camber) to counter any flexing an amount of weight loaded onto the frame 102 may cause in the frame 102.

The frame 102 may include a first substantially vertical plane 110 disposed substantially perpendicular to the horizontal plane 108. The frame 102 may include a second substantially vertical plane 112 disposed substantially perpendicular to the horizontal plane 108. The second substantially vertical plane 112 may be defined by a rear surface 114 of the second end 106 of the frame 102. The first vertical plane 110 may be separated from the second vertical plane 112 a select distance.

The top-loading rear-dumping trailer 100 may include a bulk material carrier 116. The bulk material carrier 116 may be top-loadable via a top opening 118 of the bulk material carrier 116. In some embodiments, the top-loading rear-dumping trailer 100 may be configured to be loaded with bulk material (e.g., gravel, concrete, asphalt, scrap metal, or the like) when the bulk material carrier 116 is in a load position (or configuration) (e.g., a lowered position (or configuration)). The top opening 118 may lead to a cavity 120 defined by one or more sidewalls 122 of the bulk material carrier 116. The bulk material carrier 116 may be rear-unloadable via a rear opening 124 through a rear plane 128 defined by a rear face 126 of the bulk material carrier 116. In some embodiments, the top-loading rear-dumping trailer 100 may be configured to unload bulk material through the rear opening 124 when the bulk material carrier 116 is in an unload position (or configuration) (e.g., a raised position (or configuration)). The second vertical plane 112 of the frame 102 and the rear plane 128 of the bulk material carrier 116 may be coincident when the bulk material carrier is in the load position.

The top-loading rear-dumping trailer 100 may include an unloader apparatus 130. The unloader apparatus 130 may be positioned proximate to the second end 106 of the frame 102 and the rear face 126 of the bulk material carrier 116, such that the frame 102 may be fixedly coupled (e.g., fixed in position) to the bulk material carrier 116 proximate to the second end 106 of the frame 102. The unloader apparatus 130 may include, but is not limited to, a pivot assembly positioned outside the bulk material carrier 116, or the like.

In one example, where the unloader apparatus 130 is a pivot assembly 130, the pivot assembly 130 may include a first component 132 coupled to the frame 102 and a second component 134 coupled to the bulk material carrier 116. The bulk material carrier 116 may be tiltable about a central axis shared by the first component 132 and the second component 134 when the bulk material carrier 116 transitions between the load position and the unload position. The unload position may be offset a select angle about the central axis relative to the unload position.

The cavity 120 may be configured to contain bulk material (e.g., gravel, concrete, asphalt, scrap metal, or the like). The bulk material may be loaded through the top opening 118 of the bulk material carrier 116 when the bulk material carrier 116 is in the load position. For example, the bulk material may be deposited in the top opening 118 by any suitable means including, but not limited to, hoppers, backhoes, excavators, and/or conveyor placer systems. The bulk material carrier 116 may transition between the load position and the unload position via an actuation of the unloader assembly 130. The bulk material may be unloaded through the rear opening 124 of the bulk material carrier 116 when the bulk material carrier 116 is in the unload position. In some embodiments, the rear opening 124 may feature a chute 136 to assist in unloading bulk material. Although not shown, the rear opening 124 may be at least partially covered by a door. The door may be configured to slide up, flip up, swing out, or actuate via any motion configured to remove the door from the path of bulk material being unloaded.

It is noted herein that the combination of the frame 102 and the bulk material carrier 116 may be considered a bulk material carrier system, in accordance with one or more embodiments of the disclosure.

The top-loading rear-dumping trailer 100 may include two or more frame members 138. The two or more primary frame members 138 may be substantially parallel to each other. One or more support members 140 may be coupled to the two or more frame members 138. The one or more support members 140 may be set at an angle to the two or more frame members 138, where the angle includes but is not limited to, substantially perpendicular or 90 degrees)(°), 45 degrees, 30 degrees, or another angle determined to provide a desired level of structural support.

The top-loading rear-dumping trailer 100 may include a gooseneck 142 (or gooseneck section 142 of the frame 102) between the first end 104 and the first vertical plane 110 of the frame 102.

Figure 18A:
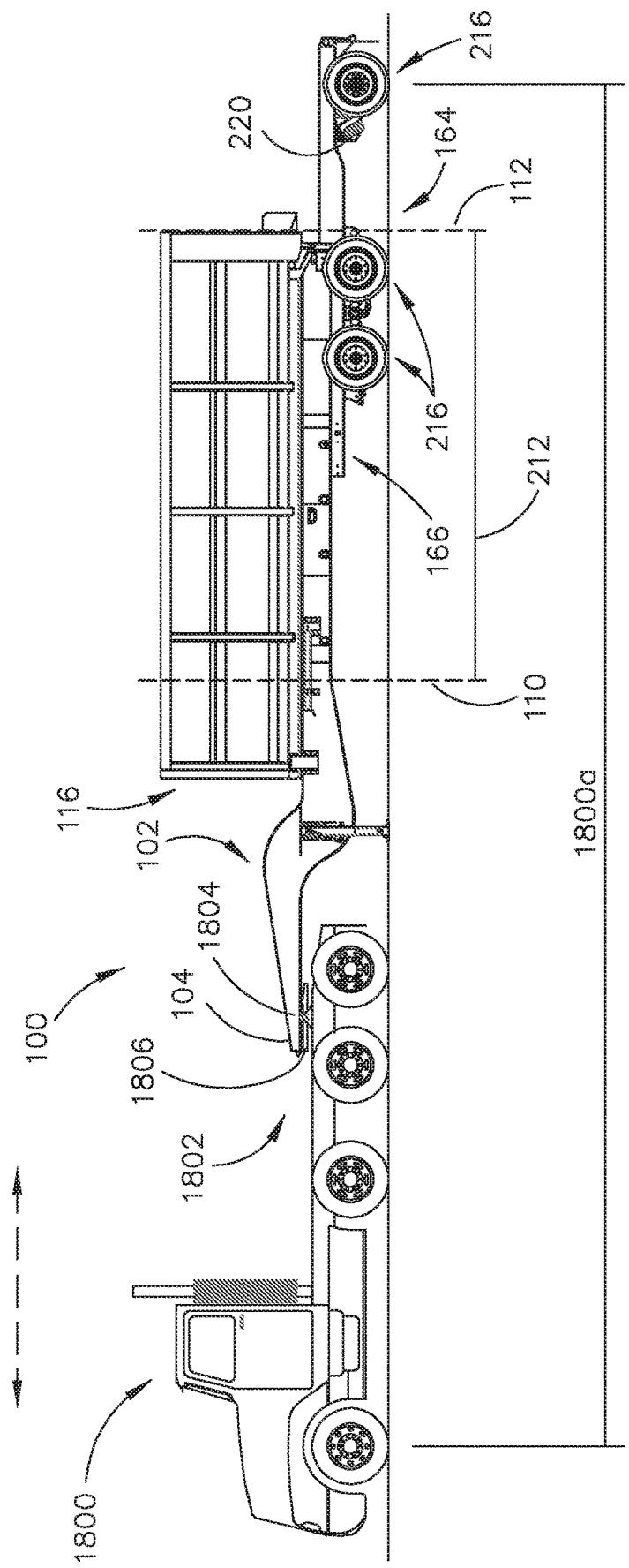
FIG. 18A illustrates a side elevation view of the trailer of FIG. 2 with the slideable secondary wheeled frame in the rearward position and the bulk material carrier in the load position, the trailer of FIG. 2 coupled to a vehicle, in accordance with one or more embodiments of the disclosure.
Figure 18B:
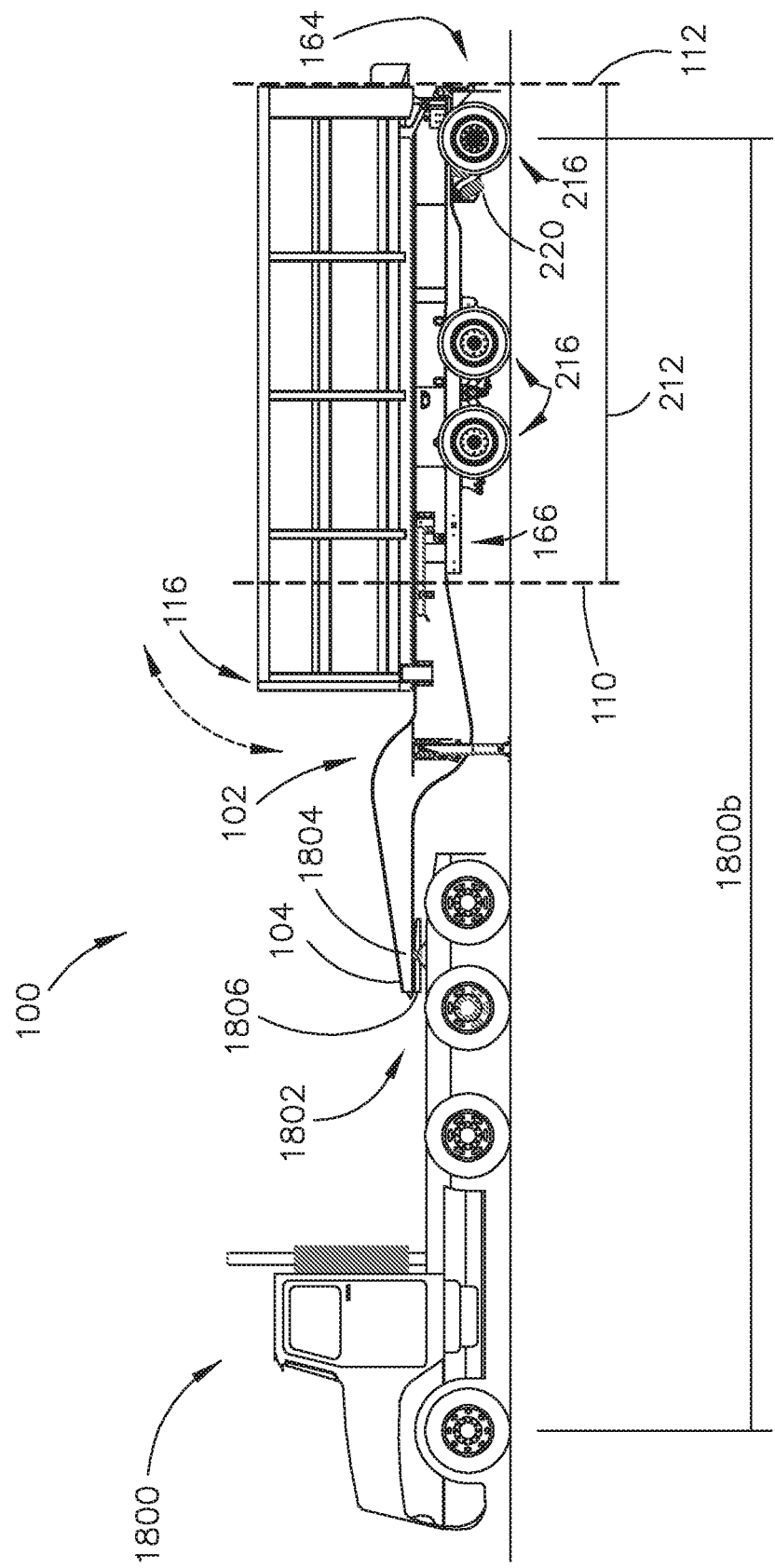
FIG. 18B illustrates a side elevation view of the trailer of FIG. 2 with the slideable secondary wheeled frame in the forward position and the bulk material carrier in the load position, the trailer of FIG. 2 coupled to the vehicle of FIG. 18A, in accordance with one or more embodiments of the disclosure.
Figure 18C:
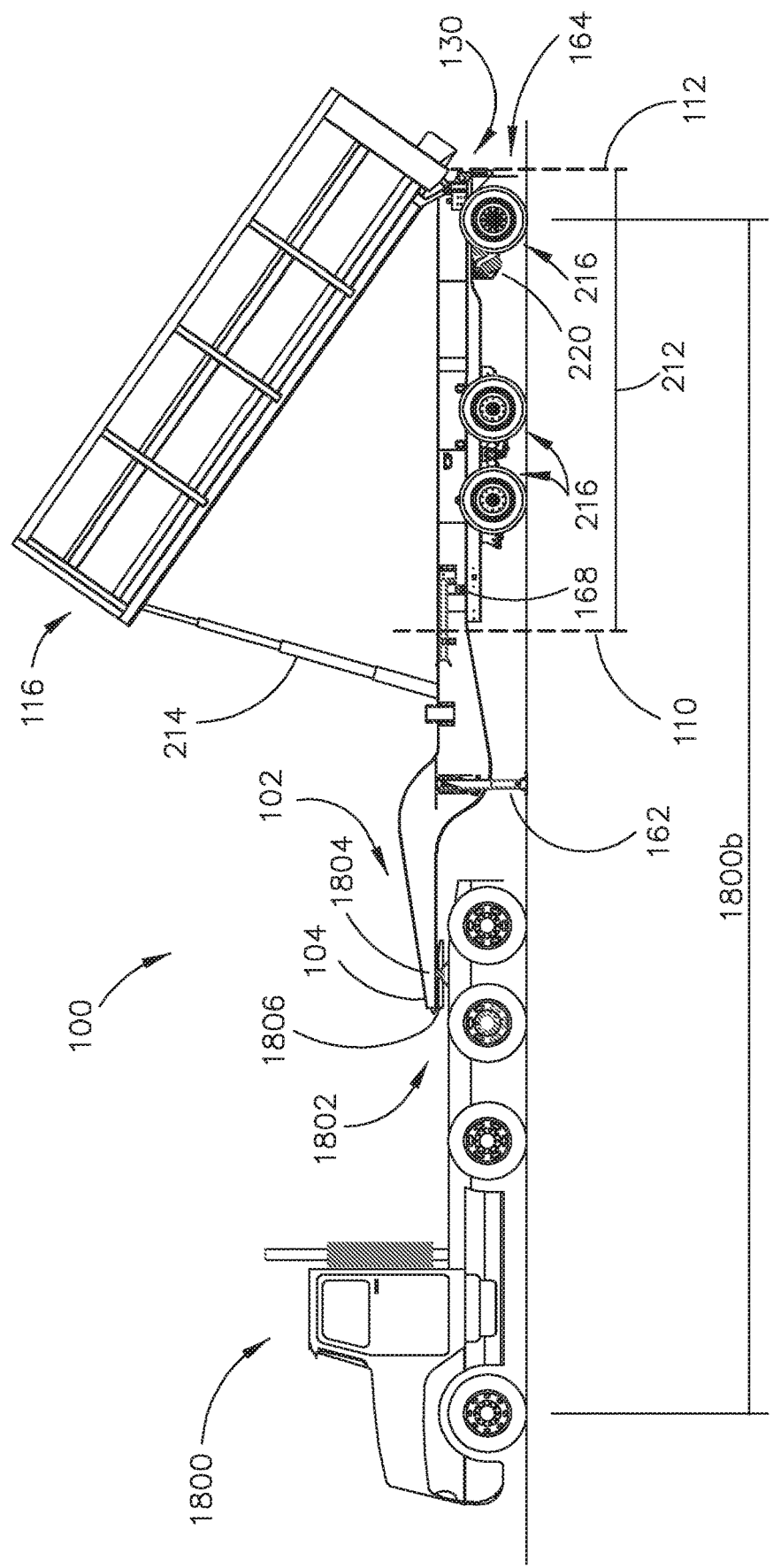
FIG. 18C illustrates a side elevation view of the trailer of FIG. 2 with the slideable secondary wheeled frame in the forward position and the bulk material carrier in the unload position, the trailer of FIG. 2 coupled to the vehicle of FIG. 18A, in accordance with one or more embodiments of the disclosure.
Figure 19A:
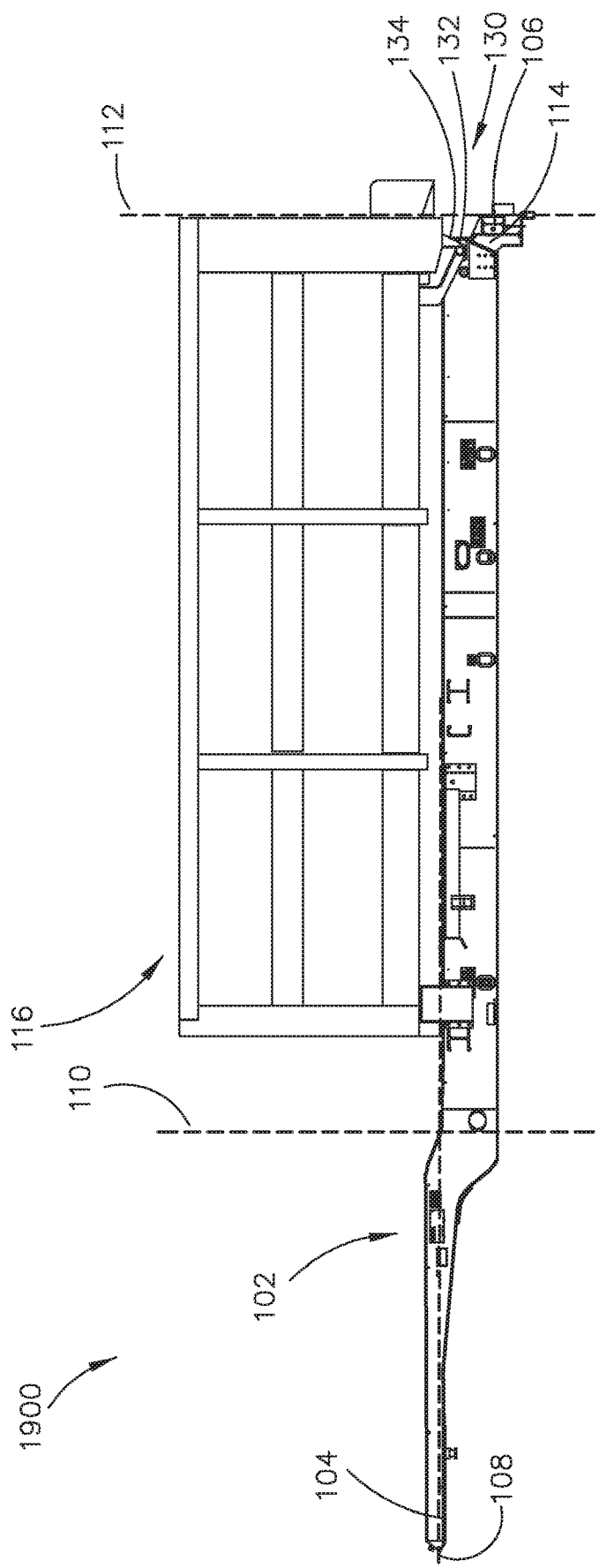
FIG. 19A illustrates a side elevation view of a bulk material carrier system of a top-loading rear-dumping slide trailer in a load position, in accordance with one or more embodiments of the disclosure.
Figure 19B:
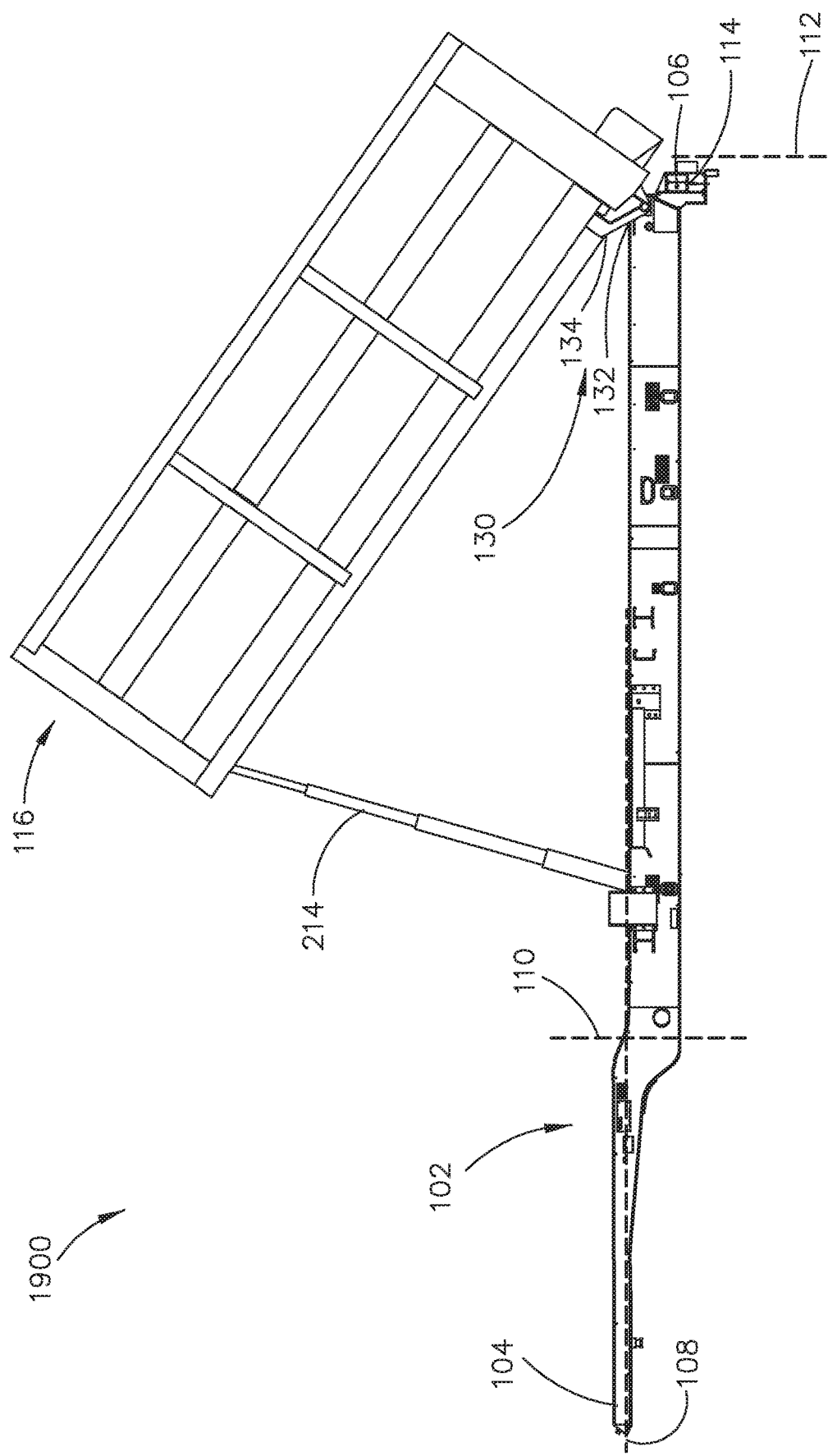
FIG. 19B illustrates a side elevation view of the bulk material carrier system as illustrated in FIG. 19A of the top-loading rear-dumping slide trailer in an unload position, in accordance with one or more embodiments of the present disclosure.
Figure 20:
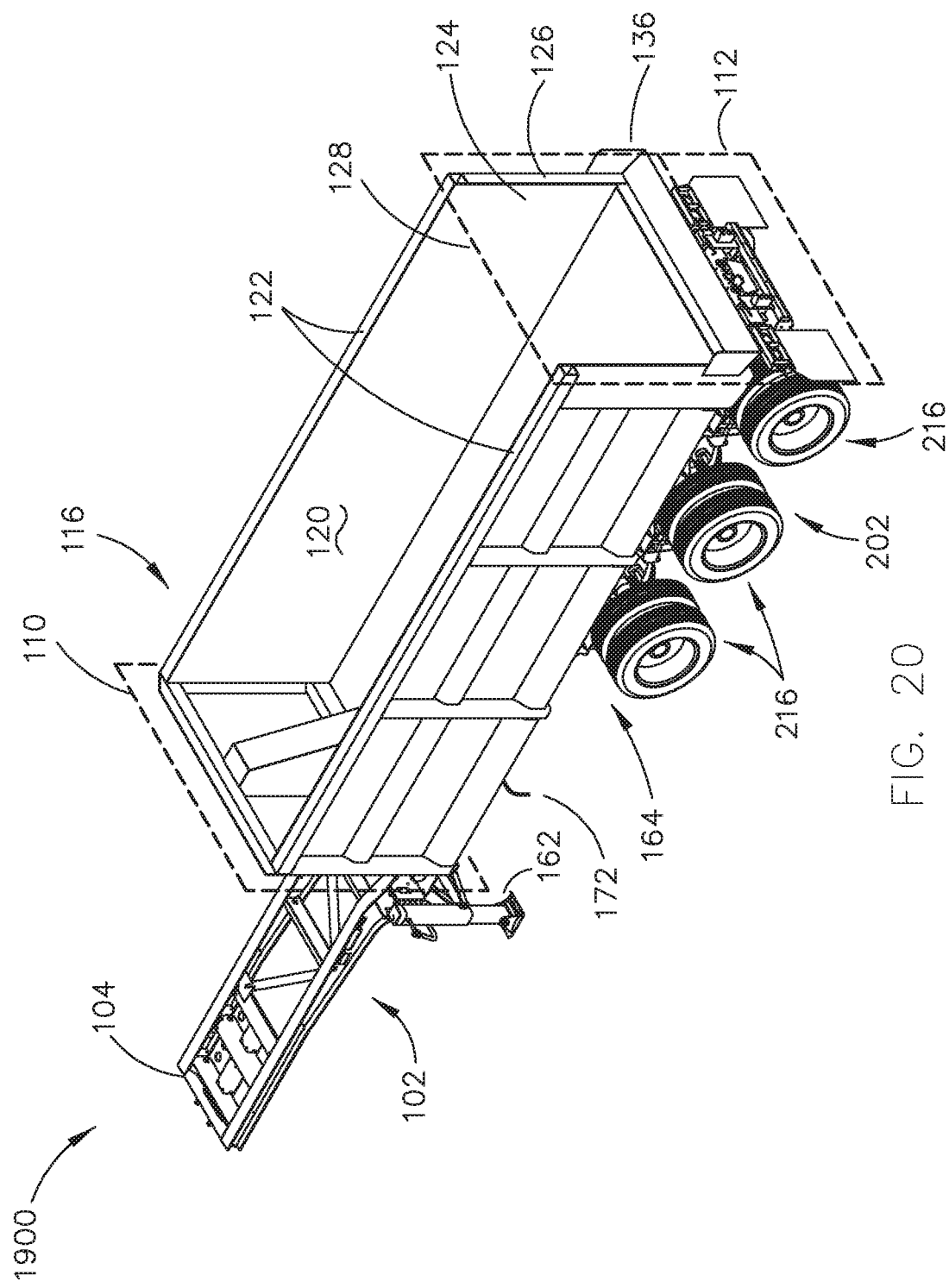
FIG. 20 illustrates a perspective view of the top-loading rear-dumping slide trailer with a slideable secondary wheeled frame in a forward position and the bulk material carrier in the load position, in accordance with one or more embodiments of the disclosure.
Figure 21:
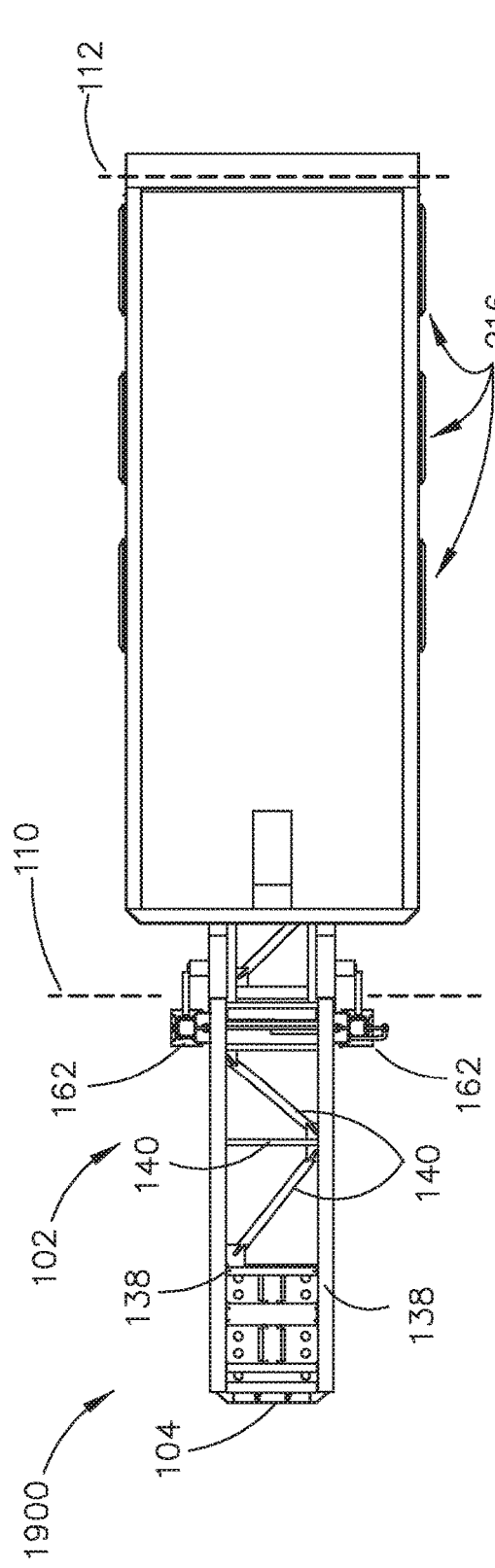
FIG. 21 illustrates a top plan view of the top-loading rear-dumping slide trailer of FIG. 20 with the slideable secondary wheeled frame in the forward position and the bulk material carrier in the load position, in accordance with one or more embodiments of the disclosure.
Figure 22:
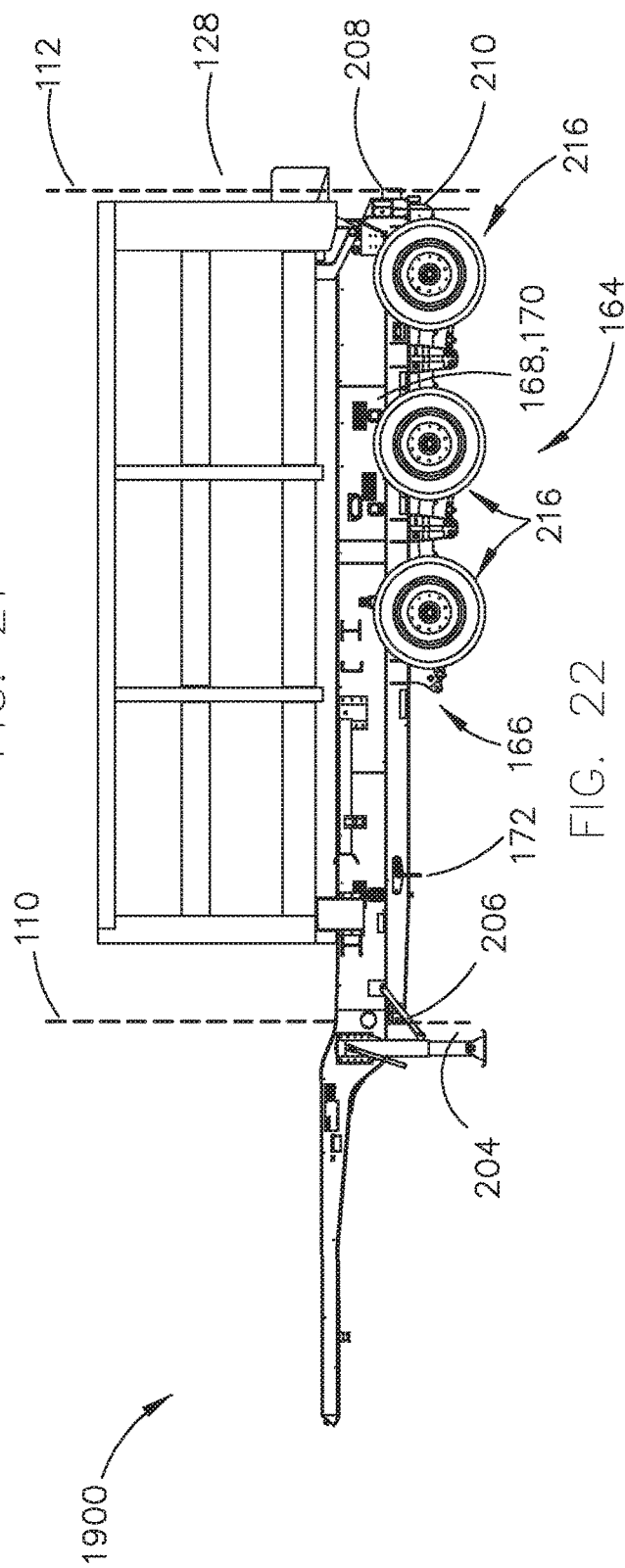
FIG. 22 illustrates a side elevation view of the top-loading rear-dumping slide trailer of FIG. 20 with the slideable secondary wheeled frame in the forward position and the bulk material carrier in the load position, in accordance with one or more embodiments of the disclosure.
Figure 23:
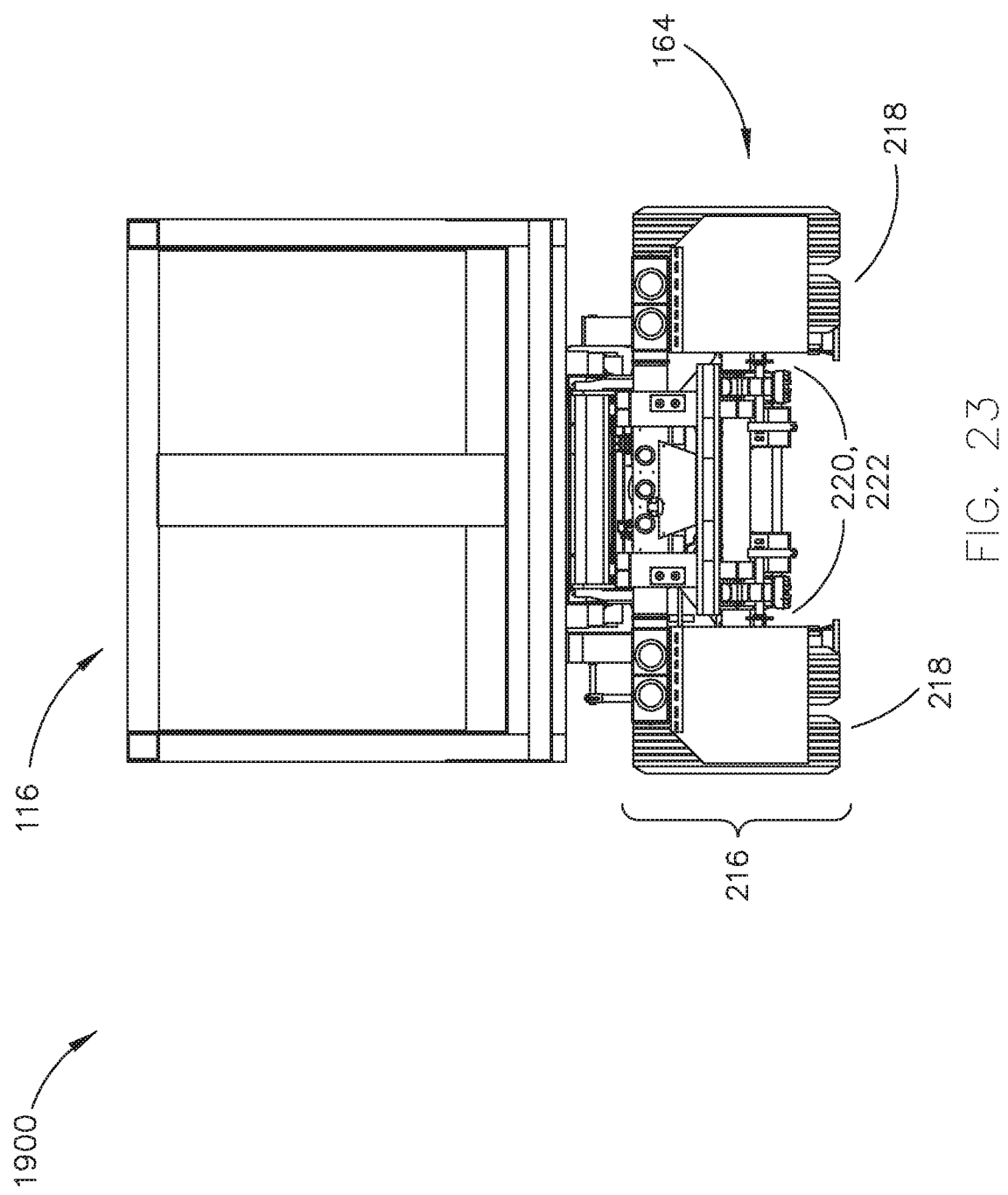
FIG. 23 illustrates a rear elevation view the top-loading rear-dumping slide trailer of FIG. 20 with the slideable secondary wheeled frame in the forward position and the bulk material carrier in the load position, in accordance with one or more embodiments of the disclosure.
Figure 24:
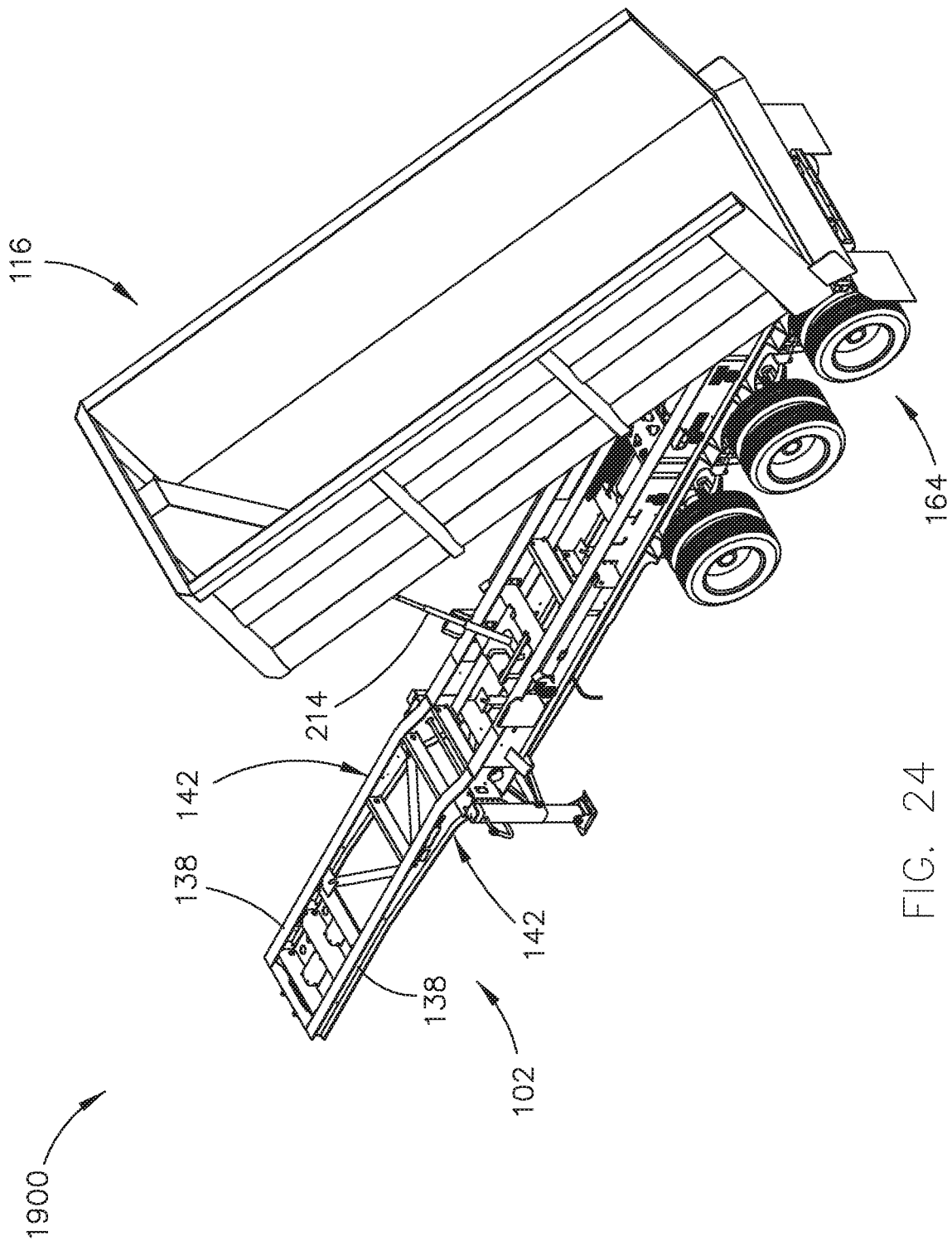
FIG. 24 illustrates a perspective view of the top-loading rear-dumping slide trailer of FIG. 20 with the slideable secondary wheeled frame in the forward position and the bulk material carrier in the unload position, in accordance with one or more embodiments of the disclosure.
Figure 25:
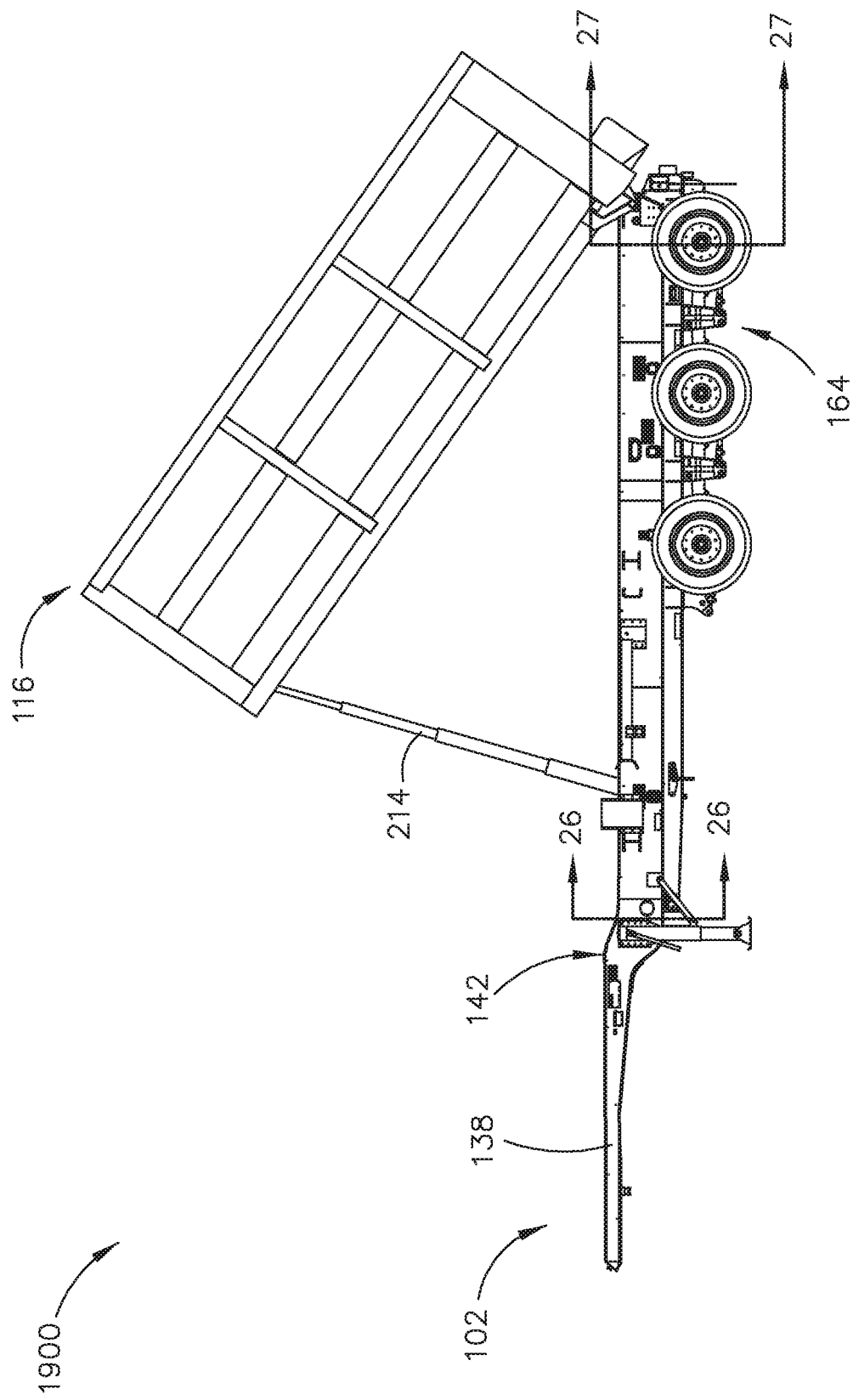
FIG. 25 illustrates a side elevation view of the top-loading rear-dumping slide trailer of FIG. 20 with the slideable secondary wheeled frame in the forward position and the bulk material carrier in the unload position, in accordance with one or more embodiments of the disclosure.
Figure 26:
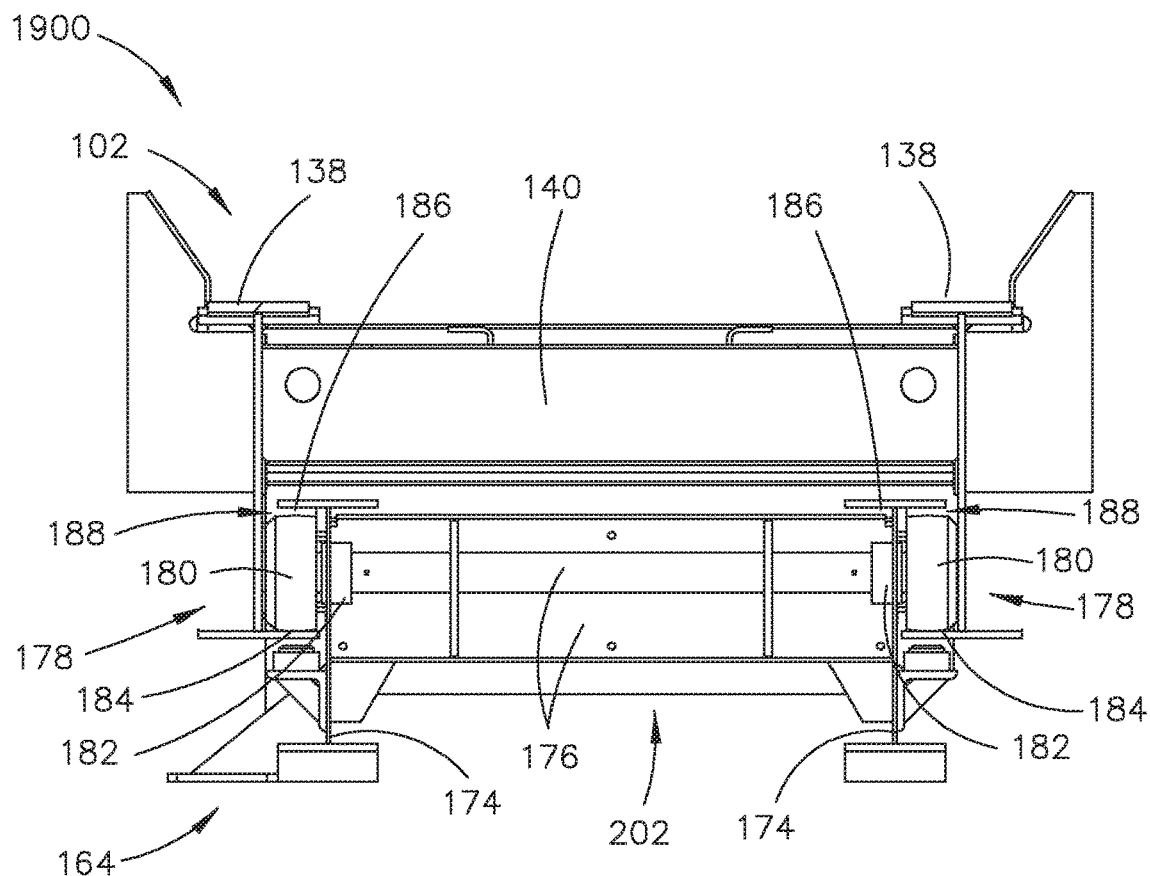
FIG. 26 illustrates a cross-section view of a frame and the slideable secondary wheeled frame of the top-loading rear-dumping slide trailer of FIG. 20, in accordance with one or more embodiments of the disclosure.
Figure 27:
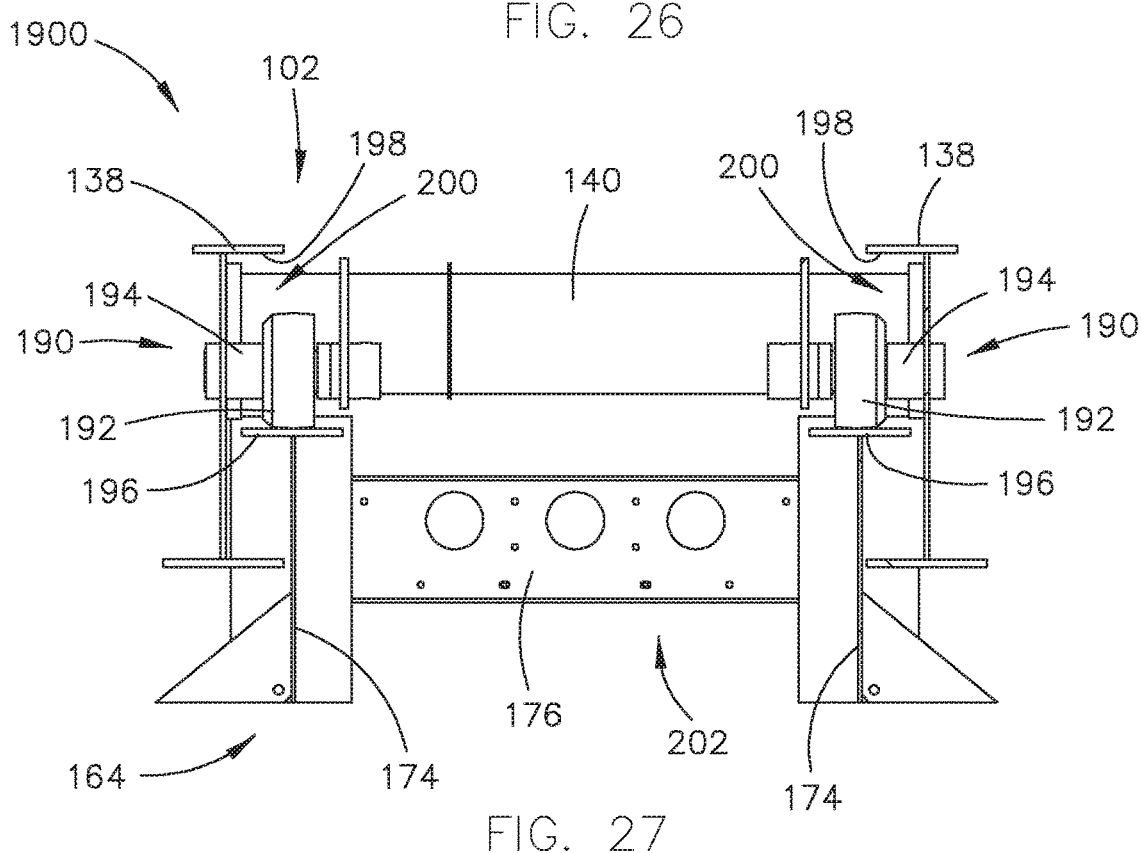
FIG. 27 illustrates a cross-section view of the frame and the slideable secondary wheeled frame of the top-loading rear-dumping slide trailer of FIG. 20, in accordance with one or more embodiments of the disclosure
Figure 28:
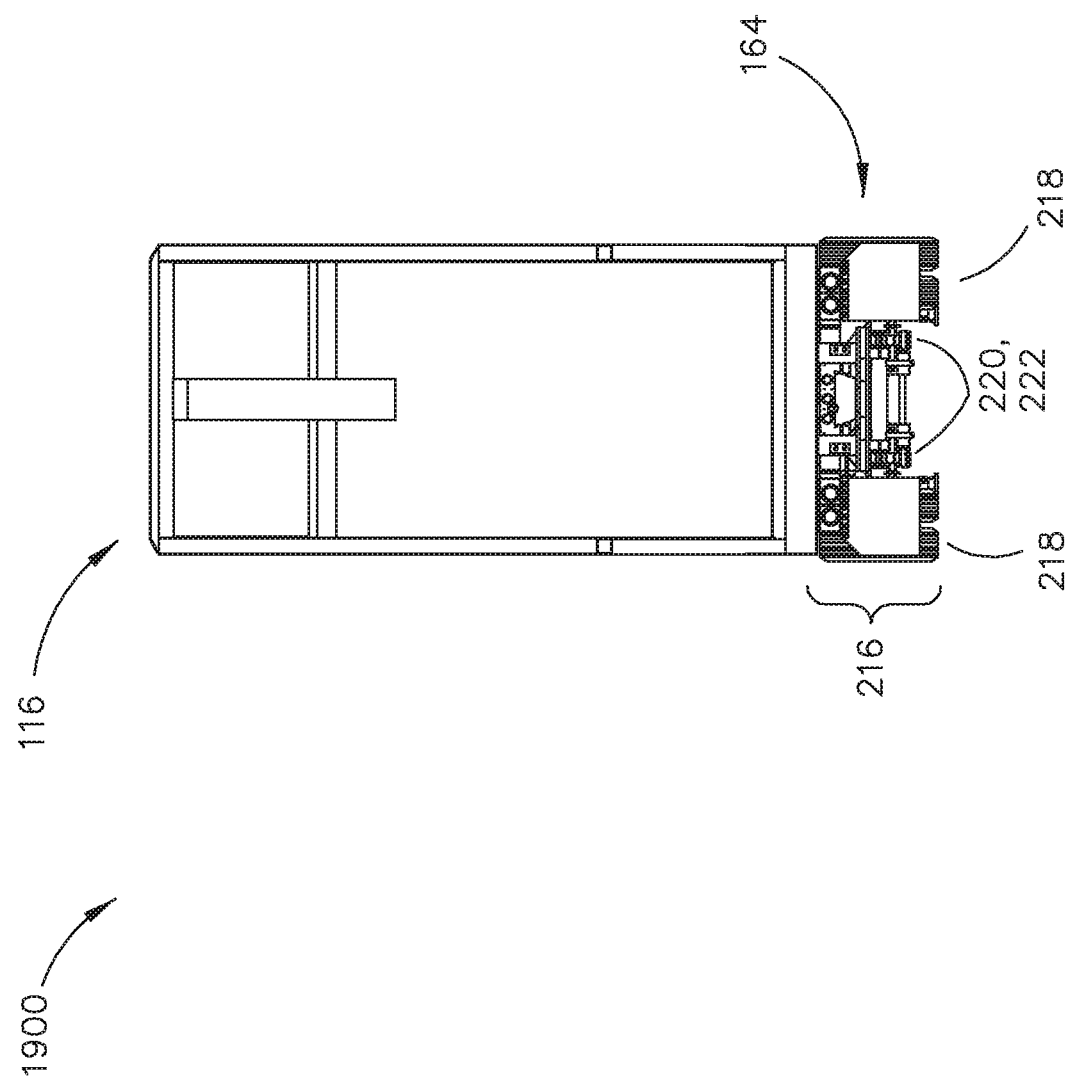
FIG. 28 illustrates a rear elevation view of the top-loading rear-dumping slide trailer of FIG. 20 with the slideable secondary wheeled frame in the forward position and the bulk material carrier in the unload position, in accordance with one or more embodiments of the disclosure.
Figure 29:
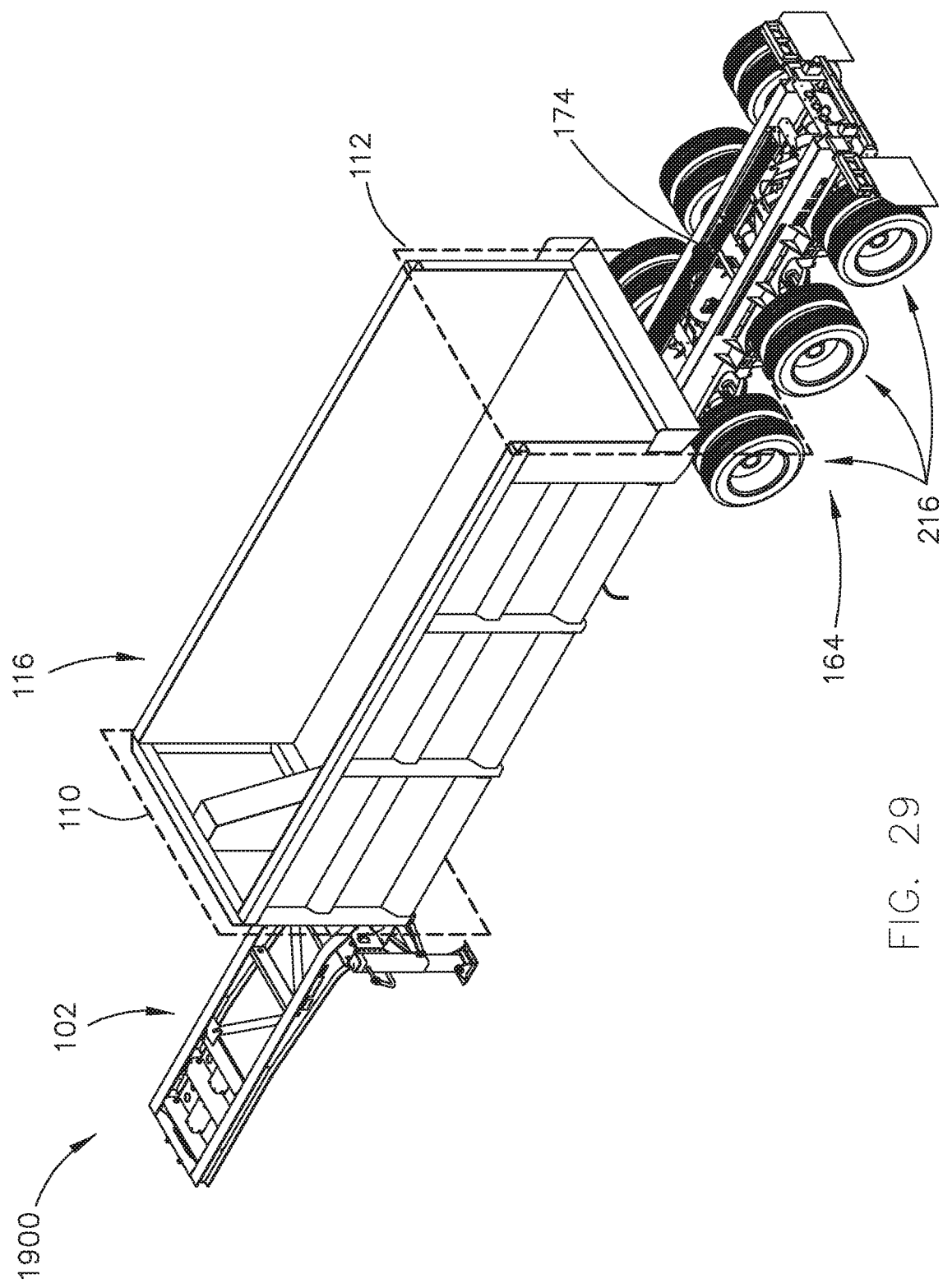
FIG. 29 illustrates a perspective view of the top-loading rear-dumping slide trailer of FIG. 20 with the slideable secondary wheeled frame in the rearward position and the bulk material carrier in the load position, in accordance with one or more embodiments of the disclosure.

The gooseneck 142 may be coupled to the frame 102, such that at least a portion of the weight of the top-loading rear-dumping trailer 100 (e.g. the frame 102, the bulk material carrier 116, bulk material, etc.) is transmitted through the gooseneck 142 to an attached vehicle (e.g., the vehicle 1800, as illustrated in FIGS. 18A-18C). The gooseneck 142 and the one or more frame members 300 of the frame 102 may be fabricated via one or more processes as a single piece (e.g. during a forming or casting process). It is noted herein, however, that the gooseneck 142 may be coupled to the one or more frame members 300 of the frame 102 by one or more fabrication processes including, but not limited to, welding and/or by one or more fasteners.

The gooseneck 142 may comprise one or more contoured profiles to reduce stress concentrations in the frame 102, where the contoured profiles may be defined by one or more angles as viewed from a side elevation view.

For example, the gooseneck 142 may include a front-top surface 144 offset an angle 146 from a front-bottom surface 148. By way of another example, the gooseneck 142 may include a left-front surface 150 offset an angle 152 from the front-bottom surface 148. By way of another example, the gooseneck 142 may include a rear-bottom surface 154 offset an angle 156 from the plane 108 of the frame 102. By way of another example, the gooseneck 142 may include a right-rear surface 158 offset an angle 160 from the plane 108 of the frame 102. It is noted herein that a plane defined by the front-bottom surface 148 and the plane 108 of the frame 102 may be coincident.

The gooseneck 142 may be suitable for reducing the loaded deflection in the neck region of the frame 102 (e.g. due to the dead load and the live-load in the bulk material carrier) and counteract sagging, due to the angles 146, 152, 156, and/or 160 of the gooseneck 142. As such, a particular combination of selected angles 146, 152, 156, and/or 160 may result in contoured profiles for the gooseneck 142 capable of supporting an increased amount of weight. It is noted herein, however, that one or more of the angles 146, 152, 156, and/or 160 may be approximately zero degrees, as the corresponding surfaces 144, 150, 154, and/or 158 may be substantially parallel to another surface and/or another plane.

The top-loading rear-dumping trailer 100 may include one or more jacks 162. The one or more jacks 162 may be configured to level and/or raise the first end 104 of the frame 102 when storing the top-loading rear-dumping trailer 100 and/or unloading the top-loading rear-dumping trailer 100. A jack 162 may be positioned proximate to a gooseneck 142 of a frame member 138. Where there are multiple jacks 162, the multiple jacks 162 may operate in tandem (e.g., are controlled by a single actuator) or may be standalone (e.g., are controlled by separate actuators).

The top-loading rear-dumping trailer 100 may include a secondary wheeled frame 164. The secondary wheeled frame 164 may be coupled to the frame 102 by a slideable assembly 202. The secondary wheeled frame 164 may be positionable (or configurable) in a forward position (or configuration) and/or a rearward position (or configuration) relative to the frame 102 via the slideable assembly 202. The secondary wheeled frame 164 may be disposed between the first vertical plane 110 and the second vertical plane 112 of the frame 102 when the secondary wheeled frame 164 is in the forward position.

The top-loading rear-dumping trailer 100 may include a lock assembly 166. The lock assembly 166 may include one or more lock pins 168 configured to at least one of engage or disengage one or more lock holes 170. It is noted herein, however, that one or more lock pins 168 may instead include one or more rods, bolts, slides, dowels, connectors, and/or any other fastener. The lock assembly 166 may include an actuator 172 (e.g., a lever, a handle, a cam plate, or the like) configured to cause the one or more lock pins 168 to at least one of engage or disengage from the one or more lock holes 170. Engaging the lock assembly 166 may secure the secondary wheeled frame 164 in either the forward position or the rearward position relative to the frame 102. Disengaging the lock assembly 166 may allow the secondary wheeled frame 164 to translate between the forward position and the rearward position via the slideable assembly 202.

The slideable assembly 202 may include two or more secondary frame members 174. The two or more secondary frame members 174 may be substantially parallel to each other. One or more secondary support members 176 may be coupled to the two or more secondary frame members 174. The one or more secondary support members 140 may be set at an angle to the two or more secondary frame members 174, where the angle includes, but is not limited to, substantially perpendicular or 90 degrees)(°, 45 degrees, 30 degrees, or another angle determined to provide a desired level of structural support. One or more bushings or other cushioning devices may be inserted between the one or more frame members 138 and the one or more secondary frame members 174.

The slideable assembly 202 may include one or more roller sets 178. A roller set 178 may include a roller 180 coupled to the secondary wheeled frame 164 via an axle 182. The roller 180 may be in contact with a surface 184 of a frame member 138 and/or a surface 186 of a secondary frame member 174. For example, the roller 180 may be in contact with a portion of the surface 184 of the frame member 138 and/or a portion of the surface 186 of the secondary frame member 174. For instance, the roller 180 may be in contact with a portion of the surface 184 of the frame member 138 and/or a portion of the surface 186 of the secondary frame member 174 within the region 212 defined between the first vertical plane 110 and the second vertical plane 112. The surface 184 of the frame member 138 and the surface 186 of the secondary frame member 174 may form a channel 188 for the roller 180.

The slideable assembly 202 may include one or roller sets 190. A roller set 190 may include a roller 192 coupled to the frame 102 via an axle 194. The roller 192 may be in contact with a surface 196 of a secondary frame member 174. For example, the roller 192 may be in contact with a portion of the surface 196 of the secondary frame member 174. For instance, the roller 192 may be in contact with a portion of the surface 196 of the secondary frame member 174 within the region 212 defined between the first vertical plane 110 and the second vertical plane 112. The surface 196 of the secondary frame member 174 and a surface 198 of a frame member 138 may form a channel 200 for the roller 192.

In this regard, a portion of a surface of the frame 102 within the region defined between the first vertical plane 110 and the second vertical plane 112 may preclude attachment of at least one axle to the frame 102 due to the slideable assembly 202, where the at least one axle is configured to come into contact with the transport surface. As such, at least the portion of the frame 102 within the region 212 defined between the first vertical plane 110 and the second vertical plane 112 may be considered "wheelless," in one or more embodiments of the disclosure, as the frame 102 may not have any axles within the region 212 defined between the first vertical plane 110 and the second vertical plane 112 because the slideable assembly 202 between the frame 102 and the secondary wheeled frame 164 may interfere with the ability to attach an axle to the frame 102 within the region 212.

Some combination of the first vertical plane 110 of the frame 102, the second vertical plane 112 of the frame 102, the rear plane 128 of the bulk material carrier 116, a front plane 204 defined by a front surface 206 of the secondary wheeled frame 164, and/or a rear plane 208 defined by a rear surface 210 of the secondary wheeled frame 164 may define a region 212.

It is noted herein that one or more of the first vertical plane 110 of the frame 102, the second vertical plane 112 of the frame 102, the rear plane 128 of the bulk material carrier 116, the front plane 204 defined by the front surface 206 of the secondary wheeled frame 164, and/or the rear plane 208 defined by the rear surface 210 of the secondary wheeled frame 164 may be coincident when the secondary wheeled frame 164 and/or the bulk material carrier 116 is in a select position. For example, the first vertical plane 110 of the frame 102 and the front plane 204 defined by the front surface 206 of the secondary wheeled frame 164 may be coincident when the secondary wheeled frame 164 is in the forward position. By way of another example, the second vertical plane 112 of the frame 102, the rear plane 128 of the bulk material carrier 116, and/or the rear plane 208 defined by the rear surface 210 of the secondary wheeled frame 164 may be coincident when the secondary wheeled frame 164 is in the forward position and the bulk material carrier 116 is in the load position. In this regard, the coincident planes 110 and 204 and the coincident planes 112, 128, and/or 208 may define the region 212 in which the secondary wheeled frame 164 is located when the secondary wheeled frame 164 is in the forward position.

It is noted herein that the first vertical plane 110 of the frame 102, the second vertical plane 112 of the frame 102, the rear plane 128 of the bulk material carrier 116, the front plane 204 defined by the front surface 206 of the secondary wheeled frame 164, and the rear plane 208 defined by the rear surface 210 of the secondary wheeled frame 164 may be defined by at least three non-colinear points on a corresponding surface or face, such that one of the at least three points are not aligned with the remaining points of the at least three points.

It is noted herein that the region 212 may instead (or in addition) be defined by the first end 104 and the second end 106 of the frame 102 when the secondary wheeled frame 164 in the forward position. In this regard, the secondary wheeled frame 164 and/or two or more load-supporting axles 216 coupled to the secondary wheeled frame 164 may be inside of the defined region 212 when the secondary wheeled frame 164 is in the forward position. In addition, at least a portion of the secondary wheeled frame 164 and/or two or more load-supporting axles 216 coupled to the secondary wheeled frame 164 may be outside of the region 212 defined by the first end 104 and the second end 106 of the frame 102 when the secondary wheeled frame 164 is in the rearward position.

It is noted herein that recitations of "horizontal" is not intended to be limiting. For example, the frame 102 may be "horizontally disposed" when parallel to the transport surface or some other reference plane. In this regard, a plane may be "horizontal" if the plane is within 0 to 15 degrees of parallel to the transport surface (or other reference plane). In addition, it is noted herein that recitations of "vertical" is not intended to be limiting. For example, some surfaces and/or faces of the top-loading rear-dumping trailer 100 may not be exactly perpendicular to the transport surface (e.g. due to ride height, suspension, design to be non-perpendicular, etc.). In this regard, a plane may be "vertical" if the plane is within 0 to 15 degrees of perpendicular to the transport surface (or other reference plane). Further, it is noted herein that recitations of "coincident" is not intended to be limited to exactly coincident. For example, some surfaces and/or faces of the top-loading rear-dumping trailer 100 may be non-planar due to not having a flat face (e.g. a curved face, a recessed region, etc.). In this regard, a plane may be "coincident" if some portion of the plane is incident to the non-planar region.

The top-loading rear-dumping trailer 100 may include one or more hydraulic cylinders 214 coupled to the frame 102 and the bulk material carrier 116. Where the unloader assembly 130 is a pivot assembly 130, the one or more hydraulic cylinders 214 may be configured to cause the bulk material carrier 116 to tilt relative to the frame 102 about the pivot assembly 130. In this regard, the one or more hydraulic cylinders 214 may be a component configured to assist the unloader assembly 130 in unloading the bulk material carrier 116.

The secondary wheeled frame 164 may include two or more load-supporting axles 216. A load-supporting axle 216 may include two or more wheels 218. For example, the load-supporting axle 216 may include two wheels 218, with a wheel 218 of the two wheels 218 on each side of the frame 102 (e.g., a single wheel arrangement). By way of another example, the load-supporting axle 216 may include four wheels 218, with two wheels 218 of the four wheels 218 on each side of the frame 102 (e.g., a dual wheel or "dually" arrangement).

The load-supporting axle 216 may be coupled to one or more brakes 220 (e.g., an electric brake, a pneumatic brake, a hydraulic brake, or the like) For example, each wheel 218 may have a brake 220.

The load-supporting axle 216 may be coupled to one or more suspension components 222. For example, the secondary wheeled frame 164 may include one or more axle components for the wheels 218 to be coupled together via a solid axle (e.g., brackets, bearings, leaf springs, shocks, struts, or the like). It is noted herein, however, that the suspension members 222 may allow each side of the load-supporting axle 216 to independently flex when traversing over the transport surface to help to stabilize the top-loading rear-dumping trailer 100. Therefore, the above description should not be interpreted as a limitation on the scope of the present disclosure, but merely an illustration.

The two or more load-supporting axles 216 may be configured with any suitable configuration of axles including, but not limited to, a pair of tandem axles (i.e. two axles with less than 96 inches between), a pair of tandem axles plus a third axle, two non-tandem axles, or three non-tandem axles. For example, the secondary wheeled frame 164 may include three load-supporting axles 216. For instance, the secondary wheeled frame 164 may include three load-supporting axles 216, where a first set of adjacent load-supporting axles 216 are separated by a first distance and a second set of adjacent load-supporting axles 216 are separated by a second distance, where the first distance is less than the second distance. In the alternative, the secondary wheeled frame 164 may include three load-supporting axles 216, where each set of adjacent load-supporting axles 216 is separated by substantially the same distance. By way of another example, in configurations where the secondary wheeled frame 164 is comprised of three axles, it is noted one or more of the three axles may comprise a lift axle.

It is noted herein that a "load-supporting axle" may be defined as an axle taken into consideration when calculating weight limits for the top-loading rear-dumping trailer 100 based on the Bridge Formula, as codified in 23 U.S.C. § 127 and 23 C.F.R. § 658. The Bridge Formula establishes the maximum weight any set of axles on a motor vehicle may carry on the Interstate highway system, and limits the weight-to-length ratio of a vehicle crossing a bridge by spreading weight over additional axles or by increasing the distance between axles.

The Bridge Formula is provided in EQ. 1. In EQ. 1, W is the overall gross weight on any group of two or more consecutive axles to the nearest 500 pounds, L is the distance in feet between the outer axles of any group of two or more consecutive axles, and N is the number of axles in the group under consideration.

$$W = 500([(L*N)/(N-1)] + 12N + 36) \quad \text{EQ. 1}$$

In addition, it is noted herein that a "load-supporting axle" may also be defined as an axle configured to support weight limits restricted by both state law and federal law, where federal law restricts single axle loads to 20,000 pounds, and axles spaced more than 40 inches and not more than 96 inches apart (tandem axles) are limited to 34,000 pounds. The single-axle weight limit is in addition to the Bridge Formula weight limit on axles not more than 40 inches apart, and the tandem-axle weight limit is in addition to the Bridge Formula weight limit for axles over 40 but not more than 96 inches apart. Gross vehicle weight is limited to 80,000 pounds.

Further, it is noted herein that federal law states any two or more consecutive axles may not exceed the weight computed by the Bridge Formula even though single axles, tandem axles, and gross weight are within legal limits. As a result, the axle group that includes an entire vehicle (e.g., the "outer bridge" group) must comply with the Bridge Formula.

Referring now to FIGS. 18A-18C, the top-loading rear-dumping trailer 100 may be coupled to a vehicle 1800 (e.g., a tractor, semi-truck, pickup truck, car, or the like) via a hitch assembly 1802. The hitch assembly 1802 may include a frame connector 1804 proximate to the first end 104 of the frame 102, wherein the frame connector 1804 is couplable to a vehicle connector 1806 of the vehicle 1800. The frame connector 1804 is rotatable relative to a position of the vehicle connector 1806 about a central axis shared by the frame connector 1804 and the vehicle connector 1806. In general, the hitch assembly 1802 may include any hitch assembly known in the art including, but not limited to, a hitch positioned over (or just in front of) a rear axle such as a gooseneck, a fifth wheel hitch, or the like; or a hitch positioned behind the rear axle such as a pintle hitch, a rear receiver hitch, a bumper hitch, a weight distribution hitch, or the like.

The placement of the two or more load-supporting axles 216 relative to the axles of the vehicle 1800 is important to ensure mobility of the vehicle 1800/top-loading rear-dumping trailer 100 combination and to comply with state and federal highway and interstate regulations. While a shorter wheelbase may be desirable to move the vehicle 1800/top-loading rear-dumping trailer 100 combination in smaller, confined spaces such on in-town roads, the longer wheelbase may be necessary to be compliant with regulations for the Interstate highway system.

In this regard, the ability to selectively adjust the length between the vehicle 1800 and the load-supporting axles 216 connected to the secondary wheeled frame 164 may be suitable to adjust the bulk material distribution on each axle of the vehicle 1800/top-loading rear-dumping trailer 100 combination by increasing the footprint of the top-loading rear-dumping trailer 100 in order to comply with state and federal regulations during Interstate highway transport, and then decreasing the footprint of the top-loading rear-dumping trailer 100 to allow for in-town/on-site transport and dumping of the bulk material.

As illustrated in FIG. 18A, the vehicle 1800/top-loading rear-dumping trailer 100 combination may be configured for loading bulk material and/or Interstate highway transport, with the secondary wheeled frame 164 being in the rearward position and the bulk material carrier 116 being in the load position. In the rearward position, at least some of the two or more load-supporting axles 216 may be outside of the region 212 defined between the first vertical plane 110 and the second vertical plane 112.

As illustrated in FIG. 18B, the vehicle 1800/top-loading rear-dumping trailer 100 combination may be configured for loading bulk material and/or in-town/on-site transport, with the secondary wheeled frame 164 being in the forward position and the bulk material carrier 116 being in the load position. In the forward position, the two or more load-supporting axles 216 may be within the region 212 defined between the first vertical plane 110 and the second vertical plane 112.

It is noted herein that the top-loading rear-dumping trailer 100 may be loaded with bulk material when the secondary wheeled frame 164 is in either the forward position or the rearward position. The ability to load bulk material in either of the forward position or the rearward position may be advantageous for allowing a selective choice of the loading configuration based on prior setup, loading site conditions, or the like. However, before the bulk material may be legally transported on the Interstate highway, it is contemplated the top-loading rear-dumping trailer 100 will be translated into the Interstate highway transport configuration with the secondary wheeled frame 164 in the rearward position.

Transitioning from the Interstate highway transport configuration to the in-town/on-site transport configuration may be accomplished by translating the secondary wheeled frame 164 between the forward position and the rearward position. To translate the secondary wheeled frame 164, the one or more brakes 220 are engaged on at least some of the wheels 218 of the two or more load-supporting axles 216 of the secondary wheel frame 164, causing the secondary wheel frame 164 to remain stationary, and the frame 102 is slid relative to the secondary wheeled frame 164 as a result of a force applied to the frame 102 by the vehicle 1800. In addition, the lock assembly 166 may be disengaged prior to and/or re-engaged after the applying of the force to the frame 102 by the vehicle 1800.

As illustrated in FIG. 18C, the vehicle 1800/top-loading rear-dumping trailer 100 combination may be configured for unloading bulk material, with the secondary wheeled frame 164 being in the forward position and the bulk material carrier 116 being in the unload position.

Transitioning to the unload configuration may be accomplished via the unloader assembly 130. For example, where the unloader assembly 130 is the pivot assembly 130, transitioning to the unload configuration may be accomplished by tilting the bulk material carrier 116 about the central axis through the pivot assembly 130 relative to the frame 102. The tilting of the bulk material carrier 116 via the pivot assembly 130 may be assisted by the one or more hydraulic cylinders 214 coupled to the frame 102 the bulk material carrier 116.

Although embodiments are directed to the secondary wheeled frame 164 being in the forward position when unloading the bulk material carrier 116, it is noted herein the secondary wheeled frame 164 may be in the rearward position when unloading the bulk material carrier 116. However, it is contemplated the bulk material carrier 116 being in the rearward position may obstruct the unloading of the bulk material carrier 116. In addition, it is contemplated unloading the bulk material carrier 116 with the bulk material carrier 116 in the rearward position would be problematic to the operation of the top-loading rear-dumping trailer 100 after unloading the bulk material carrier 116. To this effect, the top-loading rear-dumping trailer 100 may include an additional locking assembly configured to prevent the actuation of the unloader assembly 130 (e.g., the pivot assembly 130) and/or the actuation of the one or more hydraulic cylinders 214 when attempting to unload of the bulk material carrier 116 when the secondary wheeled frame 164 is not in the forward position.

In this regard, the top-loading rear-dumping trailer 100 including the slidable secondary wheeled frame 164 may provide a previously-unforeseen benefit when hauling bulk material both in town and on Interstate highway systems. Combining the slideable secondary wheeled frame 164 with the unloadable bulk material carrier 116 may allow for a shorter wheelbase 1800b when operating the vehicle 1800/top-loading rear-dumping trailer 100 combination in town and loading/unloading the vehicle, while providing an increased weight capacity for Interstate highway travel by being reconfigurable into a longer wheelbase 1800a.

Although embodiments are directed to two or more load-supporting axles 216 being coupled to the secondary wheeled frame 164, it is noted herein that non-load-supporting axles may be coupled to the secondary wheeled frame 164 within the region defined between the first vertical plane 110 and the second vertical plane 112 of the frame 102. For example, the one or more non-load-supporting axles may include, but are not limited to, raiseable/lowerable axles, axis in a fixed and raised position, and/or other axles not taken into consideration when calculating weight limits for the top-loading rear-dumping trailer 100.

In addition, although embodiments are directed to axles being coupled to the secondary wheeled frame 164, it is noted herein one or more axles (e.g., load-supporting or non-load-supporting) may be coupled to the frame 102 outside of the region defined between the first vertical plane 110 and the second vertical plane 112 of the frame 102.

It is to be understood that embodiments of any methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

FIGS. 19A-32 generally illustrate an example of a top-loading rear-dumping slide trailer 1900, in accordance with one or more embodiments of the disclosure. It is noted herein that "top-loading rear-dumping slide trailer 1900"

and variants of the term "top-loading rear-dumping slide trailer 1900" (e.g., "slide dump trailer 1900", "trailer 1900," or the like) may be considered equivalent, for purposes of the disclosure.

Any description of embodiments, examples, and/or instances directed to the top-loading rear-dumping slide trailer 100 may be directed to the top-loading rear-dumping slide trailer 1900 without departing from the disclosure.

The top-loading rear-dumping slide trailer of the disclosure (e.g., trailer 100 and/or trailer 1900) includes several advantages.

First, the top-loading rear-dumping slide trailer of the disclosure may be configured to be loaded with bulk material when the secondary wheeled frame is in either the Interstate highway configuration or the in-town/on-site configuration.

Second, the top-loading rear-dumping slide trailer of the disclosure may transport bulk material while a secondary wheeled frame is in an Interstate highway configuration, which may include a longer wheelbase that distributes weight in a manner necessary to conform with state and federal regulations.

Third, the top-loading rear-dumping slide trailer of the disclosure may be configured to transport bulk material while a secondary wheeled frame is in an in-town/on-site configuration, which may include a shorter wheelbase to allow for increased mobility (e.g., a shorter turn radius).

Fourth, the top-loading rear-dumping slide trailer of the disclosure may be configured to transition the secondary wheeled frame between the Interstate highway configuration and the in-town/on-site configuration through a force applied to the trailer by an attached vehicle, while the secondary wheeled frame is held in place with a brake.

Fifth, the top-loading rear-dumping slide trailer of the disclosure may be configured to lock the secondary wheeled frame in place by engaging the lock assembly and configured to unlock the secondary wheeled frame from the frame by disengaging the lock assembly.

Sixth, the top-loading rear-dumping slide trailer of the disclosure may be configured to be unloaded via a dumping action without interfering with the secondary wheeled frame in the in-town/on-site configuration.

As such, advantages of the disclosure are directed to a trailer configured with a frame coupled to a loadable/unloadable bulk material carrier and a slideable secondary wheeled frame.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components.

In some instances, one or more components may be referred to herein as "configured to," "configurable to," "operable/operative to," "adapted/adaptable," "able to," "conformable/conformed to," or the like. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," or the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, or the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, or the like). In those instances where a convention analogous to "at least one of A, B, or C, or the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, or the like). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. Equivalents to the inventive concepts described with reference to the embodiments illustrated in the attached drawing figures may be employed and substitutions made herein without departing from the scope of the claims. In addition, components illustrated and described herein are merely examples of a system/device and components that may be used to implement embodiments of the inventive concepts and may be replaced with other devices and components without departing from the scope of the claims. Further, any dimensions, degrees, and/or numerical ranges provided herein are to be understood as non-limiting examples unless otherwise specified in the claims. Accordingly, the scope of the invention should be limited only by the claims appended hereto.

What is claimed:

1. A top-loading rear-dumping slide trailer, comprising:
    a bulk material carrier, the bulk material carrier being top-loadable with bulk material via a top opening of the bulk material carrier when the bulk material carrier is in a load configuration, the bulk material carrier being rear-unloadable of bulk material via a rear opening of the bulk material carrier when the bulk material carrier is in an unload configuration;
    an unloader assembly configured to assist in unloading bulk material through the rear opening of the bulk material carrier when the bulk material carrier is in the unload configuration;
    a frame including a first end and a second end, the frame being fixedly coupled to the bulk material carrier proximate to the second end of the frame via the unloader assembly; and
    a secondary wheeled frame including at least two load-supporting axles, the frame being slideably couplable to the secondary wheeled frame via a slideable assembly,
    the top-loading rear-dumping slide trailer being transportable by a vehicle couplable to the first end of the frame.

2. The slide trailer of claim 1, wherein the slideable assembly comprises:
    a portion of a surface of the frame;
    a portion of a surface of the secondary wheeled frame; and
    a roller configured to pass through a channel formed by the portion of the surface of the frame and the portion of the surface of the secondary wheeled frame.

3. The slide trailer of claim 1, wherein the unloader assembly includes a pivot assembly, wherein the pivot assembly comprises:
    a first component coupled to the bulk material carrier; and
    a second component coupled to the frame,
    wherein the bulk material carrier is pivotable about a central axis shared by the first component and the second component when transitioning from the load configuration to the unload configuration,
    wherein the bulk material carrier is positionable in at least one of the load configuration or the unload configuration by the pivot assembly and one or more hydraulic cylinders connected between the frame and the bulk material carrier.

4. A method for loading, transporting, and unloading a top-loading rear-dumping slide trailer, comprising:
    loading bulk material in a bulk material carrier coupled to a frame including a first end and a second end, the bulk material carrier being top-loadable with bulk material via a top opening of the bulk material carrier when the bulk material carrier is in a load configuration, a vehicle being couplable to the first end of the frame;
    transporting the bulk material with a secondary wheeled frame being in a rearward position, the secondary wheeled frame including at least two load-supporting axles, the frame being slideably couplable to the secondary wheeled frame via a slideable assembly, one or more load-supporting axles of the at least two load-supporting axles being disposed outside of a region defined by the first end and the second end of the frame when the secondary wheeled frame is in the rearward position;
    translating the secondary wheeled frame from the rearward position to a forward position by engaging a brake on one or more load-supporting axles of the at least two load-supporting axles of the secondary wheel frame and sliding the frame relative to the secondary wheeled frame via the slideable assembly, the at least two load-supporting axles being disposed within the region defined between the first end and the second end of the frame when the secondary wheeled frame is in the forward position; and unloading the bulk material carrier, the bulk material carrier being rear-unloadable of bulk material via a rear opening of the bulk material carrier with assistance of an unloader assembly when the bulk material carrier is in an unload configuration.

5. The method of claim 4, wherein the unloader assembly comprises a pivot assembly, wherein the pivot assembly comprises:

a first component coupled to the bulk material carrier; and a second component coupled to the frame, wherein the bulk material carrier is pivotable about a central axis shared by the first component and the second component when transitioning from the load configuration to the unload configuration, wherein the bulk material carrier is positionable in at least one of the load configuration or the unload configuration by the pivot assembly and one or more hydraulic cylinders connected between the frame and the bulk material carrier.

6. The method of claim 4, further comprising:

disengaging a lock assembly prior to translating the secondary wheeled frame from the rearward position to the forward position; and engaging the lock assembly prior to unloading the bulk material.

* * * * *